(12) United States Patent
Song

(10) Patent No.: US 7,106,690 B2
(45) Date of Patent: Sep. 12, 2006

(54) METHOD FOR GENERATING AND TRANSMITTING OPTIMAL CELL ID CODES

(75) Inventor: Young Joon Song, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 883 days.

(21) Appl. No.: 09/725,514

(22) Filed: Nov. 30, 2000

(65) Prior Publication Data

US 2001/0008523 A1    Jul. 19, 2001

(30) Foreign Application Priority Data

Dec. 1, 1999  (KR) ............................ 1999-0054097
Jan. 7, 2000  (KR) ............................. 2000-00711
Feb. 1, 2000  (KR) ............................. 2000-04914

(51) Int. Cl.
    *H04J 11/00*   (2006.01)
(52) U.S. Cl. ..................................... 370/208
(58) Field of Classification Search ............. 370/310, 370/328, 329, 335, 342, 441, 479, 913, 203–209
    See application file for complete search history.

(56) References Cited

U.S. PATENT DOCUMENTS

| | | | | |
|---|---|---|---|---|
| 5,353,352 A | * | 10/1994 | Dent et al. | 380/37 |
| 5,367,516 A | * | 11/1994 | Miller | 370/203 |
| 6,088,347 A | * | 7/2000 | Minn et al. | 370/342 |
| 6,215,762 B1 | * | 4/2001 | Dent | 370/208 |
| 6,236,861 B1 | * | 5/2001 | Naor et al. | 455/458 |
| 6,373,859 B1 | * | 4/2002 | Jedwab et al. | 370/479 |
| 6,456,646 B1 | * | 9/2002 | Asokan et al. | 375/142 |
| 6,574,211 B1 | * | 6/2003 | Padovani et al. | 370/347 |
| 6,757,536 B1 | | 6/2004 | Kim et al. | |
| 2003/0013447 A1 | * | 1/2003 | Persson et al. | 455/437 |

FOREIGN PATENT DOCUMENTS

| | | |
|---|---|---|
| WO | WO97/08911 | 3/1997 |
| WO | WO9708911 | 3/1997 |

OTHER PUBLICATIONS

TSG RAN, "Optimum ID codes for SSDT".
3GPP TSG RAN WG1. "TS 25.214 V1.0.0: Third Generation Partnership Project (3GPP); Technical Specification Group (TSG); Radio Access Network (RAN); Working Group 1 (WG1); Speading and Modulation (FDD) Physical Layer Procedure."
3GPP TS25.214 V1.0.0 (Apr. 1994); UTRA FDD; Physical Layer Procedures.
"SSDT ID code" TSG-RAN Working Group 1 meeting #9, Dresden (Germany), Nov. 30th-Dec. 3rd 99, TSGR1#9(99)J40.
"CR 25.214-037: The new SSDT ID code", TSG-RAN Working Group 1 meeting #9, Dresden, Germany Nov. 30-Dec. 3, 1999 TSGR1#9(99)k17
JP Office Action dated Dec. 13, 2004.

* cited by examiner.

*Primary Examiner*—Chi Pham
*Assistant Examiner*—Dmitry Levitan
(74) *Attorney, Agent, or Firm*—Fleshner & Kim, LLP

(57) ABSTRACT

A method for generating and transmitting optimal cell (base station) identification codes in a W-CDMA mobile communication system is disclosed. In the present invention, the cell identification codes are generated using Hadamard code and bi-orthogonal code. To optimize performance in a soft handover mode, cell identification codes are generated based on at least one of Hadamard codes and bi-orthogonal codes and then effectively transmitted through an uplink channel. Also, considering dynamic allocation depending on the size of an active set, optimal SSDT cell identifier codes having a maximized minimum Hamming distance are generated and then effectively transmitted through the uplink channel.

49 Claims, 5 Drawing Sheets

| Hadamard codes of 8 bits | Hadarmad codes of 16 bits |
|---|---|
| $H_{3,0}$ =0000 0000 | $H_{4,0}$ =0000 0000 0000 0000 |
| | $H_{4,1}$ =0101 0101 0101 0101 |
| $H_{3,1}$ =0101 0101 | $H_{4,2}$ =0011 0011 0011 0011 |
| | $H_{4,3}$ =0110 0110 0110 0110 |
| $H_{3,2}$ =0011 0011 | $H_{4,4}$ =0000 1111 0000 1111 |
| | $H_{4,5}$ =0101 1010 0101 1010 |
| $H_{3,3}$ =0110 0110 | $H_{4,6}$ =0011 1100 0011 1100 |
| | $H_{4,7}$ =0110 1001 0110 1001 |
| $H_{3,4}$ =0000 1111 | $H_{4,8}$ =0000 0000 1111 1111 |
| | $H_{4,9}$ =0101 0101 1010 1010 |
| $H_{3,5}$ =0101 0101 | $H_{4,10}$=0011 0011 1100 1100 |
| | $H_{4,11}$=0110 0110 1001 1001 |
| $H_{3,6}$ =0011 1100 | $H_{4,12}$=0000 1111 1111 0000 |
| | $H_{4,13}$=0101 1010 1010 0101 |
| $H_{3,7}$ =0110 1001 | $H_{4,14}$=0011 1100 1100 0011 |
| | $H_{4,15}$=0110 1001 1001 0110 |

FIG. 3a

| Hadarmad codes of 8 bits | Hadarmad codes of 16 bits |
|---|---|
| $H_{3,0}$ =0000 0000 | $H_{4,0}$ =0000 0000 0000 0000 |
| | $H_{4,1}$ =0101 0101 0101 0101 |
| $H_{3,1}$ =0101 0101 | $H_{4,2}$ =0011 0011 0011 0011 |
| | $H_{4,3}$ =0110 0110 0110 0110 |
| $H_{3,2}$ =0011 0011 | $H_{4,4}$ =0000 1111 0000 1111 |
| | $H_{4,5}$ =0101 1010 0101 1010 |
| $H_{3,3}$ =0110 0110 | $H_{4,6}$ =0011 1100 0011 1100 |
| | $H_{4,7}$ =0110 1001 0110 1001 |
| $H_{3,4}$ =0000 1111 | $H_{4,8}$ =0000 0000 1111 1111 |
| | $H_{4,9}$ =0101 0101 1010 1010 |
| $H_{3,5}$ =0101 0101 | $H_{4,10}$=0011 0011 1100 1100 |
| | $H_{4,11}$=0110 0110 1001 1001 |
| $H_{3,6}$ =0011 1100 | $H_{4,12}$=0000 1111 1111 0000 |
| | $H_{4,13}$=0101 1010 1010 0101 |
| $H_{3,7}$ =0110 1001 | $H_{4,14}$=0011 1100 1100 0011 |
| | $H_{4,15}$=0110 1001 1001 0110 |

FIG.3b

| bi-orthogonal codes of 8 bits | bi-orthogonal codes of 16 bits |
|---|---|
| $B_{3,0}$ =0000 0000 | $B_{4,0}$ =0000 0000 0000 0000 |
| $B_{3,1}$ =1111 1111 | $B_{4,1}$ =1111 1111 1111 1111 |
| $B_{3,2}$ =0101 0101 | $B_{4,2}$ =0101 0101 0101 0101 |
| $B_{3,3}$ =1010 1010 | $B_{4,3}$ =1010 1010 1010 1010 |
| $B_{3,4}$ =0011 0011 | $B_{4,4}$ =0011 0011 0011 0011 |
| $B_{3,5}$ =1100 1100 | $B_{4,5}$ =1100 1100 1100 1100 |
| $B_{3,6}$ =0110 0110 | $B_{4,6}$ =0110 0110 0110 0110 |
| $B_{3,7}$ =1001 1001 | $B_{4,7}$ =1001 1001 1001 1001 |
| $B_{3,8}$ =0000 1111 | $B_{4,8}$ =0000 1111 0000 1111 |
| $B_{3,9}$ =1111 0000 | $B_{4,9}$ =1111 0000 1111 0000 |
| $B_{3,10}$=0101 1010 | $B_{4,10}$=0101 1010 0101 1010 |
| $B_{3,11}$=1010 0101 | $B_{4,11}$=1010 0101 1010 0101 |
| $B_{3,12}$=0011 1100 | $B_{4,12}$=0011 1100 0011 1100 |
| $B_{3,13}$=1100 0011 | $B_{4,13}$=1100 0011 1100 0011 |
| $B_{3,14}$=0110 1001 | $B_{4,14}$=0110 1001 0110 1001 |
| $B_{3,15}$=1001 0110 | $B_{4,15}$=1001 0110 1001 0110 |
|  | $B_{4,16}$=0000 0000 1111 1111 |
|  | $B_{4,17}$=1111 1111 0000 0000 |
|  | $B_{4,18}$=0101 0101 1010 1010 |
|  | $B_{4,19}$=1010 1010 0101 0101 |
|  | $B_{4,20}$=0011 0011 1100 1100 |
|  | $B_{4,21}$=1100 1100 0011 0011 |
|  | $B_{4,22}$=0110 0110 1001 1001 |
|  | $B_{4,23}$=1001 1001 0110 0110 |
|  | $B_{4,24}$=0000 1111 1111 0000 |
|  | $B_{4,25}$=1111 0000 0000 1111 |
|  | $B_{4,26}$=0101 1010 1010 0101 |
|  | $B_{4,27}$=1010 0101 0101 1010 |
|  | $B_{4,28}$=0011 1100 1100 0011 |
|  | $B_{4,29}$=1100 0011 0011 1100 |
|  | $B_{4,30}$=0110 1001 1001 0110 |
|  | $B_{4,31}$=1001 0110 0110 1001 |

METHOD FOR GENERATING AND TRANSMITTING OPTIMAL CELL ID CODES

BACKGROUND OF THE INVENTION

1. Field of the Invention

The present invention relates to a third generation mobile communication, and more particularly, to a method for generating and transmitting an optimal cell (base station) identification code using Hadamard code and bi-orthogonal code in a W-CDMA mobile communication system.

2. Background of the Related Art

The Radio Access Network (RAN) standards of the Third Generation Partnership Project (3GPP) describes a Site Selection Diversity Transmit Power Control (SSDT). The SSDT, which is a selective macro diversity technique in a soft handover mode, allows a User Equipment (UE) to select one of cells in an active set called "Primary." In this instance, all other cells are classed as "Non-primary."

The main object of the SSDT is to transmit on the downlink from a primary cell, which reduces interference caused by multiple transmissions in a soft handover mode. A second object of the SSDT is to achieve fast site selection without intervention from networks such as UMTS Terrestrial Radio Access Network (UTRAN), thus maintaining an advantage of the soft handover. In order to select a primary cell, a temporary identification (ID) is assigned to every active cell having a transmission power level higher than a predetermined level, and the UE periodically informs a primary cell ID to other connected cells. In this instance, the UE receives, measures, an compares power levels of common pilots from the respective active cells to select the primary cell, which has the greatest pilot power. Thereafter, the UE cuts off powers from all other remaining cells which are non-primary cells.

Referring to FIG. 1, an ID code for the primary cell is transmitted to cells in the active set through a Feed-Back Indicator (FBI) field among fields of a control channel, such as an up-link Dedicated Physical Control Channel (DPCCH). Next, as can be known from FIG. 2, the FBI is transmitted by 1 or 2 bits in one slot. If the FBI is transmitted by 1 bit, one radio frame is transmitted by 15 bits, and if the FBI is transmitted by 2 bits, one radio frame is transmitted by 30 bits, because one radio frame is transmitted by 15 time slots. When an ID code is transmitted to a selected primary cell, the UE determines whether one bit is inserted or 2 bits are inserted in the FBI field per one slot before transmission.

For reference, in FIG. 1, k is related to a Spreading Factor (SF) in a dedicated physical channel, wherein the SF having a value from 256 to 4 is expressed as $256/2^k$. Also, the numbers of bits of fields per a slot on dedicated physical data channel and the dedicated physical control channel of uplink DPCH are defined as in the following Tables.

TABLE 1

| slot format #I | channel bit rate kbps | channel symbol rate ksps | SF | bits per frame | bits per slot | number of Ndata bits |
|---|---|---|---|---|---|---|
| 0 | 15 | 15 | 256 | 150 | 10 | 10 |
| 1 | 30 | 30 | 128 | 300 | 20 | 20 |
| 2 | 60 | 60 | 64 | 600 | 40 | 40 |
| 3 | 120 | 120 | 32 | 1200 | 80 | 80 |
| 4 | 240 | 240 | 16 | 2400 | 160 | 160 |
| 5 | 480 | 480 | 8 | 4800 | 320 | 320 |
| 6 | 960 | 960 | 4 | 9600 | 640 | 640 |

TABLE 2

| slot format #I | CH bit rate | CH symbol rate | SF | bits per frame | bits per slot | No. of bits of $N_{pilot}$ | No. of bits of $N_{TFCI}$ | No. of bits of $N_{FBI}$ | No. of bits of $N_{TPC}$ |
|---|---|---|---|---|---|---|---|---|---|
| 0 | 15 | 15 | 256 | 150 | 10 | 6 | 2 | 0 | 2 |
| 1 | 15 | 15 | 256 | 150 | 10 | 8 | 0 | 0 | 2 |
| 2 | 15 | 15 | 256 | 150 | 10 | 5 | 2 | 1 | 2 |
| 3 | 15 | 15 | 256 | 150 | 10 | 7 | 0 | 2 | 2 |
| 4 | 15 | 15 | 256 | 150 | 10 | 6 | 0 | 2 | 2 |
| 5 | 15 | 15 | 256 | 150 | 10 | 5 | 2 | 2 | 1 |

The NFBI, representing a number of bits per slot inserted in the FBI field, is used in a closed loop mode transmit diversity or SSDT, which requires feed back between access points of the UE and the UTRAN. As shown in FIG. 2, the NFBI has an S field and a D field. The S field is used for processing a SSDT signal and the D field is used for processing a feed back mode transmission diversity signal. A length of the S field or D field may be 0, 1, 2. When both a power control by SSDT and a transmission diversity in feed back mode are used at the same time, the S field and the D field are required to each have one bit.

The operation of the SSDT for reducing interference caused by multiple transmission in the soft handover mode will next be explained in more detail.

In a soft handover mode, the SSDT is initially activated by UTRAN based on the cells in the active set, and thereafter the UTRAN of the SSDT option activated during a present soft handover period informs the cell and the UE. In this instance, a temporary ID is assigned to each active cell based on an order of the active set, and the assignment information on the IDs is given to the active cells and the UE. Thus, an active cell can identify its entry position in the active list, by which the ID code can also be determined. At the same time, the UE receives the active list and can assign ID codes of to active cells based on the order of entry of the cells on the list. Therefore, the UTRAN and the UE have corresponding information of the ID codes and the cells.

Moreover, the active list is renewed frequently and the renewed active list is provided to all active cells and the UE. After the SSDT and UE acknowledgement are activated, the UE starts to transmit the ID code of the primary cell, and the active cells start to detect primary cell ID information following a successful SSDT activation and admission of the UE acknowledgement.

The setting of temporary cell ID will next be explained.

A temporary ID is provided to cells during the SSDT for use as a site selection signal. In the SSDT mode, when an upper layer decides to make transmissions between a UE and a cell, the UE designates the most appropriate cell in the active cells as the primary cell and informs the UTRAN through the FBI field. Also, transmitting a signal to only one cell during the active SSDT mode can enhance a cell performance as intercellular interferences are reduced from the remaining other cells. The temporary cell ID is given as a binary bit sequence having a particular bit length, which is shown in Tables 3 and 4, below.

Table 3 shows temporary ID codes when the FBI is transmitted by one bit per slot, and Table 4 shows temporary ID codes when the FBI is transmitted by two bits per slot. As can be known from Tables 3 and 4, the temporary ID code may be in three forms of "Long," "Medium," and "Short," and there can be 8 codes for each of the forms. The temporary ID codes are required to be transmitted within one frame. If the space for sending a given ID code cannot be obtained within a frame, i.e. the entire ID cannot be transmitted within a frame but must be split over two frames, the last bit(s) of the temporary ID code is (are) punctured. In Table 3 and 4 below, the bit(s) to be punctured in such cases are shown with brackets.

TABLE 3

| ID label | ID code | | |
|---|---|---|---|
| | Long | Medium | Short |
| A | 000000000000000 | 0000000(0) | 00000 |
| B | 111111111111111 | 1111111(1) | 11111 |
| C | 000000000111111 | 0000111(1) | 00011 |
| D | 111111110000000 | 1111000(0) | 11100 |
| E | 000011111111000 | 0011110(0) | 00110 |
| F | 111100000000111 | 1100001(1) | 11001 |
| G | 001111000011110 | 0110011(0) | 01010 |
| H | 110000111100001 | 1001100(1) | 10101 |

In Table 3, the long ID code with a code length 15 has a maximized minimum hamming distance $d_{min}$ max. 7; the medium ID code with a code length 8 has a maximized minimum hamming distance $d_{min}$ max. 4; the ID code with a code length 7, having the last bit punctured in the medium ID code with a code length 8, has a maximized minimum hamming distance $d_{min}$ max. 3; and the short ID code with a code length 5 has a maximized minimum hamming distance $d_{min}$ max. 2.

TABLE 4

| ID label | ID code | | |
|---|---|---|---|
| | Long | Medium | Short |
| A | 0000000(0) | 000(0) | 000 |
| | 0000000(0) | 000(0) | 000 |
| B | 1111111(1) | 111(1) | 111 |
| | 1111111(1) | 111(1) | 111 |
| C | 0000000(1) | 000(0) | 000 |
| | 1111111(1) | 111(1) | 111 |
| D | 1111111(1) | 111(1) | 111 |
| | 0000000(0) | 000(0) | 000 |
| E | 0000111(1) | 001(1) | 001 |
| | 1111000(0) | 110(0) | 100 |
| F | 1111000(0) | 110(0) | 110 |
| | 0000111(1) | 001(1) | 011 |
| G | 0011110(0) | 011(0) | 010 |
| | 0011110(0) | 011(0) | 010 |
| H | 1100001(1) | 100(1) | 101 |
| | 1100001(1) | 100(1) | 101 |

In the Table 4, the long ID code with a code length 16 has a maximized minimum hamming distance $d_{min}$ max. 8; the ID code with a code length 14, having the last bit pair punctured in the long ID code with a code length 16, has a maximized minimum hamming distance $d_{min}$ max. 6; the medium ID code with a code length 8 has a maximized minimum hamming distance $d_{min}$ max. 4; the ID code with a code length 6, having the last bit punctured in the medium ID code with a code length 8; has a maximized minimum hamming distance $d_{min}$ max. 2; and the short ID code with a code length 6 has a maximized minimum hamming distance $d_{min}$ max. 2.

The following Table 5 shows a number of times of site selection permitted to select a primary cell per one frame for different forms of ID codes, according to the temporary ID code characteristics shown in Tables 3 and 4.

TABLE 5

| code length | a number of FBI bits assigned per slot for SSDT | |
|---|---|---|
| | 1 | 2 |
| ALong@ | one site selection per frame | two site selection per frame |
| AMedium@ | two site selection per frame | four site selection per frame |
| AShort@ | three site selection per frame | five site selection per frame |

Referring to Table 5, if the number of FBI bits per slot is 1, the number of site selection per frame is one using a long ID code because 15 bits, one bit per slot, can be transmitted in each frame. If the number of FBI bits per slot is 2, the number of site selection per frame is two because 30 bits, two bits per slot, can be transmitted in each frame. Similarly, if the number of FBI bits per slot is 1, the number of site selection per frame is 2 using a medium ID code and 3 using a short ID code. Finally, if the number of FBI bits per slot is 2, the number of site selection per frame is 4 using a medium ID code and 5 using a short ID code.

Furthermore, when two bits of FBI are transmitted per slot, the 8 long ID codes of 14 bit lengths have a maximum cross-correlation value of "2" and a maximized minimum hamming distance 6 ($d_{min}$=6) while the 8 medium ID codes of 6 bit lengths and the 8 short ID codes of 6 bit lengths respectively have a maximum cross-correlation value of "2" and a maximized minimum hamming distance 2 ($d_{min}$=2). Here, for the long ID code of 14 bits, 2 bits of the last column of Table 2 are puncture, and for the medium ID code with a code length of 6, 2 bits of the last column are also punctured.

As described before, when the UE assigns one of the temporary ID codes as the primary cell ID code and sends the primary cell ID code after the SSDT and the UE acknowledgement, the primary cell ID code is sent through the FBI field in the uplink control channel. Particularly, a cell is non-primary if the following three conditions are met, where $N_{ID}$ is a length (a number of bits) of the generated temporary ID.

1. The received primary ID code does not match with its own ID code;
2. the received uplink signal quality satisfies a quality threshold defined by UTRAN; and
3. the number of symbols punctured in the uplink compressed mode is smaller than $\lambda N_{ID}/3\mu$.

Otherwise, if any one of the above three conditions are not met, a cell is maintained as a primary cell.

The termination of the SSDT is determined by the UTRAN. Particularly, the UTRAN terminates the SSDT in a method identical to a procedure for terminating the soft handover, and informs the termination to all cells and the UE. Thus, in the related art SSDT, performance of cell ID code used for identifying respective cells is dependent on the maximum cross-correlation value or the maximized minimum hamming distance. Accordingly, an optimal cell ID code which has a maximum cross-correlation value or a maximized minimum hamming distance is required, and a method for identifying a cell using the optimal cell ID code is required.

SUMMARY OF THE INVENTION

Accordingly, the present invention is directed to a method for generating and transmitting optimal cell ID codes, that substantially obviates one or more of the problems due to limitations and disadvantages of the related art.

An object of the present invention is to provide a method for generating optimal cell Id codes for a soft handover.

Another object of the present invention is to provide a method for transmitting optimal cell ID codes for a soft handover.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for generating and transmitting optimal cell ID codes includes generating cell ID codes using Hadamard codes, which has first bit values of 0; and allocating the generated ID codes to cells which require ID codes.

In the above embodiment, the cell ID codes may be generated by either deleting or puncturing first bits of the Hadamard codes. The cell Id codes may be generated by either deleting or puncturing first and second bits of the Hadamard codes. The cell ID codes may also be generated by deleting first, second and sixth bits of the Hadamard codes.

In addition, the Hadamard codes in which the first bit of the second half of a code has a bit value of 0 is selected. Accordingly, the cell ID codes may be generated by either deleting or puncturing first bits of the selected Hadamard codes. The cell Id codes may be generated by either deleting or puncturing first and second bits of the selected Hadamard codes. The cell ID codes may also be generated by deleting first, second and sixth bits of the selected Hadamard codes.

A method for generating and transmitting optimal cell ID codes according to another embodiment of the present invention includes generating, at a UE, cell ID codes based on at least one of Hadamard codes or bi-orthogonal codes during an SSDT; respectively allocating the generated cell ID codes to active cells of the UE; periodically measuring, at the UE, received power levels of common pilots transmitted from the active cells to select a primary cell; and periodically transmitting ID codes of the selected primary cell to the active cells.

A still another method for generating and transmitting optimal cell ID codes according to the present invention includes allocating, at a UE, cell ID codes generated based on Hadamard codes during an SSDT to active cells; periodically measuring, at the UE, received power levels of common pilots transmitted from the active cells to select a primary cell; and periodically transmitting, at the UE, ID codes allocated to the selected primary cell to the active cells through a FBI field of an uplink control channel.

A further method for generating and transmitting optimal cell ID codes according to the present invention includes generating, at a UE, a plurality of cell ID codes based on Hadamard codes and bi-orthogonal codes during an SSDT; allocating the generated ID codes to active cells; periodically measuring, at the UE, received power levels of common pilots transmitted from the active cells to select a primary cell; and determining, at the UE, the number of bits which will be inserted into a FBI field of each slot when ID codes of the selected primary cell are transmitted to the active cells; repeating the ID codes of the primary cell selected by the UE among the generated ID codes by one or more number of times, depending on cell ID code types; and transmitting the ID codes to the active cells through an uplink control channel.

A still further method for generating and transmitting optimal cell ID codes according to the present invention includes selectively allocating, at a UE, one or more codes selected from cell ID codes based on Hadamard codes or bi-orthogonal codes depending on the number of active cells belonging to an active set of the UE, to the effective cells; repeating corresponding ID codes allocated by the UE by at least one or more number of times; and transmitting the ID codes to the active cells during the SSDT.

BRIEF DESCRIPTION OF THE DRAWINGS

The invention will be described in detail with reference to the following drawings in which like reference numerals refer to like elements wherein:

FIG. 3A shows Hadamard codes for generating temporary ID codes according to the present invention;

FIG. 3B shows bi-orthogonal codes for generating temporary ID codes according to the present invention;

DETAILED DESCRIPTION OF THE PREFERRED EMBODIMENTS

Figure 1:
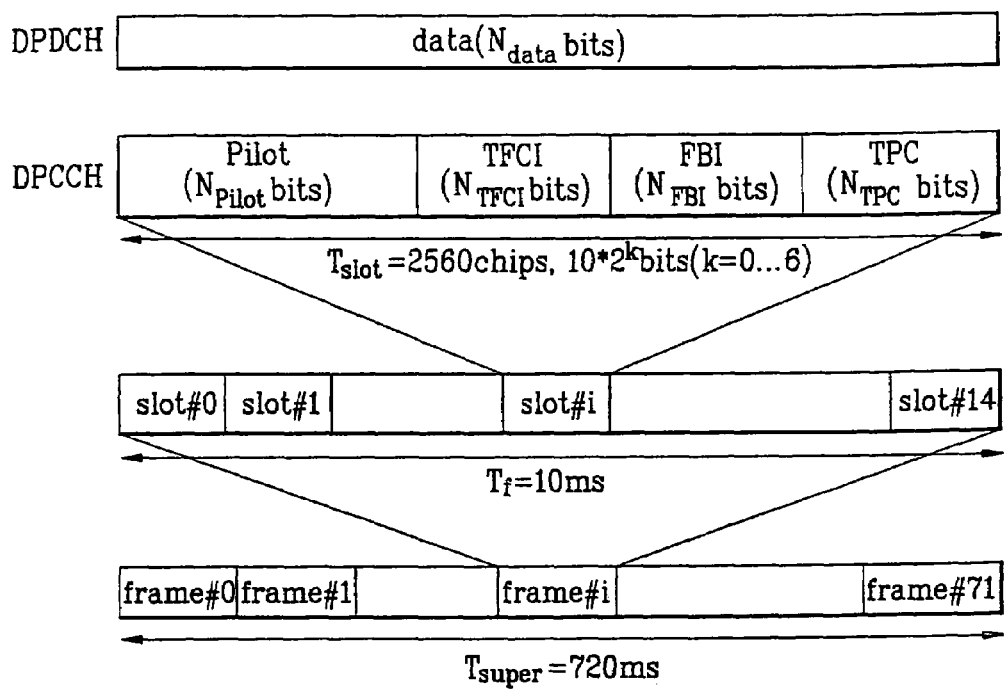
FIG. 1 shows a structure of an uplink DPCH in the related art according to 3GPP standards.
Figure 2:
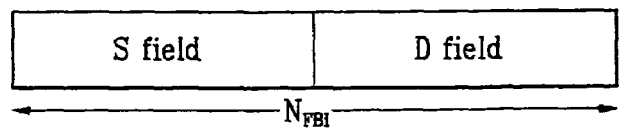
FIG. 2 shows a FBI field of the uplink DPCH in the related art according to 3GPP standards.

Reference will now be made in detail to the preferred embodiments of the present invention, examples of which are illustrated in the accompanying drawings. According to the present invention, temporary cell ID codes are generally generated using either the Hadamard codes or the bi-orthogonal codes, or both. Particularly, the Hadamard code is used in the first embodiment, both the Hadamard codes and the bi-orthogonal codes are used in the second embodiment, and either the Hadamard codes or the bi-orthogonal codes are used in the third embodiment depending upon a predetermined condition.

The first embodiment will first be explained. Temporary cell IDs are provided for each unit of a binary bit sequence having a specific bit code length, and temporary cell ID codes suggested in the first embodiment are shown in Tables 6 and 7 below. Namely, Table 6 shows temporary ID codes when the FBI is transmitted by one bit per slot, and Table 7 shows temporary ID codes when the FBI is transmitted by two bits per slot. According to the current 3GPP standards, the FBI is also used for data bit transmission in closed loop transmit diversity.

As can be known from Tables 6 and 7, there are three types or forms of temporary ID code, "Long," "Medium," and "Short." Also, there can be 8 codes for each of the type. As in the related art, the temporary ID codes are required to be transmitted within one frame. However, if the space for sending a given ID code cannot be obtained within a frame, i.e. the ID code cannot be transmitted within a frame but must be split over two frames, the first bit or the first and second bits of the temporary ID code are punctured. In Tables 6 and 7 below, the bit(s) to be punctured in such cases are shown with brackets.

TABLE 6

| | Identifier Code | | |
|---|---|---|---|
| Identifier Label | Long | Medium | Short |
| A | 000000000000000 | (0)0000000 | 00000 |
| B | 101010101010101 | (0)1010101 | 10110 |
| C | 011001100110011 | (0)0110011 | 01101 |
| D | 110011001100110 | (0)1100110 | 11011 |
| E | 000111100001111 | (0)0001111 | 00011 |
| F | 101101001011010 | (0)1011010 | 10101 |
| G | 011110000111100 | (0)0111100 | 01110 |
| H | 110100101101001 | (0)1101001 | 11000 |

TABLE 7

| | Identifier Code | | |
|---|---|---|---|
| Identifier Label | Long | Medium | Short |
| A | (0)0000000 | (0)000 | 000 |
| | (0)0000000 | (0)000 | 000 |
| B | (0)0000000 | (0)000 | 000 |
| | (1)1111111 | (1)111 | 111 |
| C | (0)1010101 | (0)101 | 101 |
| | (0)1010101 | (0)101 | 101 |
| D | (0)1010101 | (0)101 | 101 |
| | (1)0101010 | (1)010 | 010 |
| E | (0)0110011 | (0)011 | 011 |
| | (0)0110011 | (0)011 | 011 |
| F | (0)0110011 | (0)011 | 011 |
| | (1)1001100 | (1)100 | 100 |
| G | (0)1100110 | (0)110 | 110 |
| | (0)1100110 | (0)110 | 110 |
| H | (0)1100110 | (0)110 | 110 |
| | (1)0011001 | (1)001 | 001 |

Of the temporary Id codes shown in Tables 6, when one FBI bit per slot is transmitted, eight long ID codes with code lengths of 15 bits have a maximum cross correlation function value of "−1" and a maximized minimum Hamming distance value of 8 ($d_{min}=8$). Eight medium ID codes with code lengths of 7 bits have a maximum cross correlation function value of "−1" and a maximized minimum Hamming distance value of 4 ($d_{min}=4$), while eight short ID codes with code lengths of 5 bits have a maximum cross correlation function value of "1" and a maximized minimum Hamming distance value of 2 ($d_{min}=2$). Here, the long ID codes with a code length of 15 bits are generated by deleting the first bit from the Hadamard codes of 16 bits. Also, the medium ID codes with a code length of 7 bits are generated by puncturing the first bit from the Hadamard codes of 8 bits.

Of the temporary ID codes shown in Table 7, when two FBI bits per slot is transmitted, eight long ID codes with code lengths of 14 bits have a maximum cross correlation function value of "0" and a maximized minimum Hamming distance value of 7 ($d_{min}=7$). Eight medium ID codes with code lengths of 6 bits and eight short ID codes with code lengths of 6 bits respectively have a maximum cross correlation function value of "0" and a maximized minimum Hamming distance value of 3 ($d_{min}=3$). Here, the long ID codes with a code length of 14 bits are generated by puncturing the two bits corresponding to the first column in Table 7 (first and second bits of the Hadamard codes of 16 bits). Also, the medium ID codes with a code length of 6 bits are generated by puncturing the 2 bits corresponding to the first column of Table 7 (first and second bits of the Hadamard codes of 8 bits).

A UE periodically measures received power levels of pilots transmitted by active cells of the UE, so that a cell having a received power level greater than a threshold value is selected as a primary cell. One of the temporary ID codes is determined as a primary cell ID code to be periodically transmitted to active cells within an active set. The primary cell ID code is transmitted through the FBI field of an uplink control channel. At this time, the temporary ID codes are inserted into the FBI by 1 bit or 2 bits and transmitted.

In the first embodiment of the present invention, the temporary ID codes of Tables 6 and 7 are generated using the Hadamard codes of FIG. 3A. Particularly, FIG. 3A shows Hadamard codes having code lengths of 8 bits and 16 bits. In the first embodiment, eight SSDT ID codes are used for each ID code type. Accordingly, eight Hadamard codes of 8 bits or eight Hadamard codes of 16 bits are selectively used.

A method for generating the temporary ID codes based on the Hadamard codes of FIG. 3A will be described below.

In the present invention, considering that the first bits of the Hadamard codes are all "0," bits punctured at a transmitting party can be recognized in advance when the temporary ID codes generated by Table 6 or 7 are decoded by a receiving party. Thus, decoding gain is obtained.

The temporary ID codes corresponding to a case where one FBI per slot is transmitted as shown in Table 6 are generated as follows. In this case, the first bit of each Hadamard code is either deleted or punctured considering that the first bit of each Hadamard code is "0." This is because there is no reduction of the Hamming distance for a set temporary ID code. Hereinafter, the temporary ID code will be called an ID code.

The eight long ID codes having a code length of 15 bits are generated by deleting the first bit of the Hadamard codes having a code length of 16 bits.

The eight medium ID codes having a code length of 7 bits are generated using the Hadamard codes having a code length of 8 bits. However, the code length that can be inserted and transmitted by each frame is 15 bits. Thus, for each frame, the medium ID codes can be repeated twice and transmitted. Since the ID codes generated by repeating twice the Hadamard codes of 8 bits exceeds the number of bits that can be transmitted per frame by 1 bit, the ID codes are transmitted after puncturing the first bit of one of the Hadamard codes of 8 bits as shown in Table 6.

The eight short ID codes having a code length of 5 bits are generated by deleting the first bit, the fifth bit, and the eight bit of the Hadamard codes having a code length of 8 bits. In this case, since the ID codes have a code length of 15 bit that can be transmitted per frame, the eight short ID codes generated by deleting 3 bits of the Hadamard codes of 8 bits are repeated three times and transmitted. Also, in the present invention, other short ID codes generated by deleting 3 bits of the Hadamard codes of 8 bits can be used. These short ID codes will be described later.

The temporary ID codes corresponding to a case where two FBI per slot is transmitted as shown in Table 7 are generated as follows. Since the first bits of the Hadamard codes are all "0," the first bit of each Hadamard code is either deleted or punctured. Also, since the FBI is transmitted at bits per slot, the number of ID bits that can be transmitted per frame is 30 bits.

The eight long ID codes having a code length of 14 bits are generated using the Hadamard codes having a code length of 16 bits. In this case, since the number of bits that can be inserted and transmitted in one frame is 30 bits, the Hadamard codes of 16 bits can be repeated twice. However, if the Hadamard codes of 16 bits is repeated twice, the number of bits that can be transmitted per frame is exceeded by 2 bits. Accordingly, the ID codes are transmitted after puncturing the first bits of the first column (first and second bits of the Hadamard code bits) from one of the repeated Hadamard codes of 16 bits as shown in Table 7.

The eight medium ID codes having a code length of 6 bits are generated using Hadamard codes having a code length of 8 bits. In this case, since code length that can be inserted and transmitted by one frame is code length of 30 bits, the medium ID codes based on the Hadamard codes of 8 bits can repeat four times. However, the medium ID codes based on the Hadamard codes of 8 bits exceed the number of bits that can be transmitted per frame, by 2 bits when repeated four times. Accordingly, the ID codes are transmitted after puncturing the first bits of the first column (the first and second bits) from one of the repeated Hadamard codes of 8 bits as shown in Table 7.

The eight short ID codes having a code length of 6 bits are generated by deleting a pair of bits, i.e. the first bits of the first column (first and second bits), from the Hadamard codes having a code length of 8 bits.

As discussed above, upon activating acknowledgment of the SSDT and the UE, the UE determines one of the temporary ID codes as a primary cell ID code. Thus, the primary cell ID code is periodically transmitted to the active cells within the active set through the FBI field of the uplink control channel. Furthermore, in the present invention, other temporary ID codes are suggested as shown in Table 8.

Table 8 shows temporary ID codes corresponding to a case where the temporary ID codes are inserted one FBI bit per slot and transmitted.

TABLE 8

| Identifier Label | Identifier Code | | |
| --- | --- | --- | --- |
| | Long | Medium | Short |
| A | 000000000000000 | (0)0000000 | 00000 |
| B | 101010101010101 | (0)1010101 | 11111 |
| C | 011001100110011 | (0)0110011 | 00011 |
| D | 110011001100110 | (0)1100110 | 11100 |
| E | 000111100001111 | (0)0001111 | 00110 |
| F | 101101001011010 | (0)1011010 | 11001 |
| G | 011110000111100 | (0)0111100 | 01010 |
| H | 110100101101001 | (0)1101001 | 10101 |

The temporary ID codes of Table 8 differ from those of Table 6 in the short ID codes. In other words, under the current 3GPP standards, when the FBI is transmitted by 1 bit per slot, the short ID codes have an optimized cross correlation value of "2." Accordingly, the short ID codes existing in the related art can be used. Particularly, the eight short ID codes of Table 8 is generated by deleting the first, fifth, and eighth bits of the Hadamard codes having a code length of 8 bits. However, in addition to these eight short ID codes having of 5 bit code lengths, other short ID codes generated by deleting three bits from Hadamard codes of 8 bits may be used. Tables 9, 10 and 11 show other short ID codes.

TABLE 9

| Hadarmad code having code length of 8 Position of column of bit | Short identifier code having code length of 5 | | | | | | |
| --- | --- | --- | --- | --- | --- | --- | --- |
| 1 2 3 4 5 6 7 8 | 4 5 6 7 8 | 3 5 6 7 8 | 3 4 6 7 8 | 3 4 5 7 8 | 3 4 5 6 8 | 3 4 5 6 7 | 2 5 6 7 8 |
| 0 0 0 0 0 0 0 0 | 0 0 0 0 0 | 0 0 0 0 0 | 0 0 0 0 0 | 0 0 0 0 0 | 0 0 0 0 0 | 0 0 0 0 0 | 0 0 0 0 0 |
| 0 1 0 1 0 1 0 1 | 1 0 1 0 1 | 0 0 1 0 1 | 0 1 1 0 1 | 0 1 0 0 1 | 0 1 0 1 1 | 0 1 0 1 0 | 1 0 1 0 1 |
| 0 0 1 1 0 0 1 1 | 1 0 0 1 1 | 1 0 0 1 1 | 1 1 0 1 1 | 1 1 0 1 1 | 1 1 0 0 1 | 1 1 0 0 1 | 0 0 0 1 1 |
| 0 1 1 0 0 1 1 0 | 0 0 1 1 0 | 1 0 1 1 0 | 1 0 1 1 0 | 1 0 0 1 0 | 1 0 0 1 0 | 1 0 0 1 1 | 1 0 1 1 0 |
| 0 0 0 0 1 1 1 1 | 0 1 1 1 1 | 0 1 1 1 1 | 0 0 1 1 1 | 0 0 1 1 1 | 0 0 1 1 1 | 0 0 1 1 1 | 0 1 1 1 1 |
| 0 1 0 1 1 0 1 0 | 1 1 0 1 0 | 0 1 0 1 0 | 0 1 0 1 0 | 0 1 1 1 0 | 0 1 1 0 0 | 0 1 1 0 1 | 1 1 0 1 0 |
| 0 0 1 1 1 1 0 0 | 1 1 1 0 0 | 1 1 1 0 0 | 1 1 1 0 0 | 1 1 1 1 0 | 1 1 1 1 0 | 1 1 1 1 0 | 0 1 1 0 0 |
| 0 1 1 0 1 0 0 1 | 0 1 0 0 1 | 1 1 0 0 1 | 1 0 0 0 1 | 1 0 1 0 1 | 1 0 1 0 1 | 1 0 1 0 0 | 1 1 0 0 1 |

TABLE 10

| Hadarmad code having code length of 8 Position of column of bit | Short identifier code having code length of 5* | | | | | | |
| --- | --- | --- | --- | --- | --- | --- | --- |
| 1 2 3 4 5 6 7 8 | 2 4 6 7 8 | 2 4 5 7 8 | 2 4 5 6 8 | 2 4 5 6 7 | 2 3 6 7 8 | 2 3 5 7 8 | 2 3 5 6 8 |
| 0 0 0 0 0 0 0 0 | 0 0 0 0 0 | 0 0 0 0 0 | 0 0 0 0 0 | 0 0 0 0 0 | 0 0 0 0 0 | 0 0 0 0 0 | 0 0 0 0 0 |
| 0 1 0 1 0 1 0 1 | 1 1 1 0 1 | 1 1 0 0 1 | 1 1 0 1 1 | 1 1 0 1 0 | 1 0 1 0 1 | 1 0 0 0 1 | 1 0 0 1 1 |
| 0 0 1 1 0 0 1 1 | 0 1 0 1 1 | 0 1 0 1 1 | 0 1 0 0 1 | 0 1 0 0 1 | 0 1 0 1 1 | 0 1 0 1 1 | 0 1 0 0 1 |
| 0 1 1 0 0 1 1 0 | 1 0 1 1 0 | 1 0 0 1 0 | 1 0 0 1 0 | 1 0 0 1 1 | 1 1 1 1 0 | 1 1 0 1 0 | 1 1 0 1 0 |
| 0 0 0 0 1 1 1 1 | 0 0 1 1 1 | 0 0 1 1 1 | 0 0 1 1 1 | 0 0 1 1 1 | 0 0 1 1 1 | 0 0 1 1 1 | 0 0 0 1 1 |
| 0 1 0 1 1 0 1 0 | 1 1 0 1 0 | 1 1 1 1 0 | 1 1 1 0 0 | 1 1 1 0 1 | 1 0 0 1 0 | 1 0 1 1 0 | 1 0 1 0 0 |
| 0 0 1 1 1 1 0 0 | 0 1 1 0 0 | 0 1 1 0 0 | 0 1 1 1 0 | 0 1 1 1 0 | 0 1 1 0 0 | 0 1 1 0 0 | 0 1 1 1 0 |
| 0 1 1 0 1 0 0 1 | 1 0 0 0 1 | 1 0 1 0 1 | 1 0 1 0 1 | 1 0 1 0 0 | 1 1 0 0 1 | 1 1 1 0 1 | 1 1 1 0 1 |

TABLE 11

| Hadarmad code having code length of 8 Position of column of bit | Short identifier code having code length of 5 | | | | | | |
|---|---|---|---|---|---|---|---|
| 1 2 3 4 5 6 7 8 | 2 3 5 6 7 | 2 3 4 7 8 | 2 3 4 6 8 | 2 3 4 6 7 | 2 3 4 5 8 | 2 3 4 5 7 | 2 3 4 5 6 |
| 0 0 0 0 0 0 0 0 | 0 0 0 0 0 | 0 0 0 0 0 | 0 0 0 0 0 | 0 0 0 0 0 | 0 0 0 0 0 | 0 0 0 0 0 | 0 0 0 0 0 |
| 0 1 0 1 0 1 0 1 | 1 0 0 1 0 | 1 0 1 0 1 | 1 0 1 1 1 | 1 0 1 1 0 | 1 0 1 0 1 | 1 0 1 0 0 | 1 0 1 0 1 |
| 0 0 1 1 0 0 1 1 | 0 1 0 0 1 | 0 1 1 1 1 | 0 1 1 0 1 | 0 1 1 0 1 | 0 1 1 0 1 | 0 1 1 0 1 | 0 1 1 0 0 |
| 0 1 1 0 0 1 1 0 | 1 1 0 1 1 | 1 1 0 1 0 | 1 1 0 1 0 | 1 1 0 1 1 | 1 1 0 0 0 | 1 1 0 0 1 | 1 1 0 0 1 |
| 0 0 0 0 1 1 1 1 | 0 0 1 1 1 | 0 0 0 1 1 | 0 0 0 1 1 | 0 0 0 1 1 | 0 0 0 1 1 | 0 0 0 1 1 | 0 0 0 1 1 |
| 0 1 0 1 1 0 1 0 | 1 0 1 0 1 | 1 0 1 1 0 | 1 0 1 0 0 | 1 0 1 0 1 | 1 0 1 1 0 | 1 0 1 1 1 | 1 0 1 1 0 |
| 0 0 1 1 1 1 0 0 | 0 1 1 1 0 | 0 1 1 0 0 | 0 1 1 1 0 | 0 1 1 1 0 | 0 1 1 1 0 | 0 1 1 1 0 | 0 1 1 1 1 |
| 0 1 1 0 1 0 0 1 | 1 1 1 0 0 | 1 1 0 0 1 | 1 1 0 0 1 | 1 1 0 0 0 | 1 1 0 1 1 | 1 1 0 1 0 | 1 1 0 1 0 |

The short ID codes shown in Tables 9, 10 and 11 are generated to have a code length of 5 bits by deleting the first bits of the Hadamard codes having a code length of 8 bits and then deleting 2 other bits in 21 patterns.

In other words, each of the short ID codes having a code length of 5 bits, as shown in Table 9, is generated by deleting 3 bits of position patterns (1,2,3), (1,2,4), (1,2,5), (1,2,6), (1,2,7), (1,2,8), and (1,3,4) from the eight Hadamard codes of 8 bits. The short ID codes having a code length of 5 bits shown in Table 10 are generated by deleting 3 bits of position patterns (1,3,5), (1,3,6), (1,3,7), (1,3,8), (1,4,5), (1,4,6), and (1,4,7) from the eight Hadamard codes of 8 bits. Finally, the short ID codes having a code length of 5 bits shown in Table 11 are generated by deleting 3 bits of position patterns (1,4,8), (1,5,6), (1,5,7), (1,5,8), (1,6,7), (1,6,8), and (1,7,8) sequentially from the eight Hadamard codes of 8 bits.

In the present invention, a portion of the short ID codes shown in Table 9, those generated by deleting the first and second bits of the Hadamard codes of 8 bits, is used. That is, the short ID codes having a code length of 5 bits, generated by deleting 3 bits in the six position patterns (1,2,3), (1,2,4), (1,2,5), (1,2,6), (1,2,7), and (1,2,8), are used.

In generating the short ID codes of 5 bits or 6 bits using the Hadamard codes of 8 bits, the ID codes can be generated by a common deletion pattern of deleting the first bits and the second bits to insert and transmit 1 bit or 2 bits into the FBI field per slot. Thus, the hardware which will be used for decoding at the receiving party can be obtained simply. Thus, 21 short ID codes having a code length of 5 bits are generated and have the same maximized minimum Hamming distance. In the present invention, the short ID codes generated using the position pattern (1,2,6) are used from among the 21 short Id codes. Namely the short ID codes are generated by deleting the first, second and sixth bits of the Hadamard codes of 8 bits. Table 12 shows temporary ID codes based on the short ID codes of the position pattern (1,2,6).

TABLE 12

| | Identifier Code | | |
|---|---|---|---|
| Identifier Label | long | medium | short |
| A | 000000000000000 | (0)0000000 | 00000 |
| B | 101010101010101 | (0)1010101 | 01001 |
| C | 011001100110011 | (0)0110011 | 11011 |
| D | 110011001100110 | (0)1100110 | 10010 |
| E | 000111100001111 | (0)0001111 | 00111 |
| F | 101101001011010 | (0)1011010 | 01110 |
| G | 011110000111100 | (0)0111100 | 11100 |
| H | 110100101101001 | (0)1101001 | 10101 |

In Table 12, the deletion position pattern (1,2,6) for generating the short ID codes of 5 bits is applicable to a case where the ID codes are inserted into the FBI field 2 bits per slot. Accordingly, both case in which the ID codes are inserted into the FBI field 1 bit per slot and the case in which the ID codes are inserted into the FBI field 2 bits per slot have similarity in the deletion patterns, thereby obtaining decoding gain.

Table 13 shows performance gain of the present invention in comparison to existing performance gain for each ID code types.

TABLE 13

| | case where FBI per slot is 1 bit | | | | case where FBI per slot is 2 bit | | | | |
|---|---|---|---|---|---|---|---|---|---|
| AWGN Channel | long (15) | medium (8) | medium (7) | short (5) | long (16) | long (14) | medium (8) | medium (6) | short (6) |
| Conventional | 0 | 0 | 0 | 0 | 0 | 0 | 0 | 0 | 0 |
| Present Invention | 0.3 | −0.1 | 0.7 | 0.25 | 0 | −0.2 | −0.1 | 0.8 | 0.8 |

Table 14 shows performance gain of the present invention in comparison to existing performance gain for each ID code types.

TABLE 14

| AWGN Channel | case where FBI per slot is 1 bit | | | | case where FBI per slot is 2 bit | | | | |
|---|---|---|---|---|---|---|---|---|---|
| | long (15) | medium (8) | medium (7) | short (5) | long (16) | long (14) | medium (8) | medium (6) | short (6) |
| Conventional | 0 | 0 | 0 | 0 | 0 | 0 | 0 | 0 | 0 |
| Present Invention | 1.5 | 0 | 1.0 | 1.5 | 1.0 | 1.3 | −0.2 | 2 | 2 |

In first embodiment, the temporary ID codes may be used during the SSDT. The temporary ID codes may also be used when the UE desires to transmit its own cell data to the UTRAN. In this case, the temporary ID codes can be optimized for the cross correlation characteristics and the Hamming distance.

The second embodiment of the present invention will next be explained. Temporary cell IDs are provided for each unit of a binary bit sequence having a specific bit code length, and temporary cell ID codes suggested in the second embodiment are shown in Tables 15 and 16 below. Namely, Table 15 shows temporary ID codes when the FBI is transmitted by one bit per slot, and Table 16 shows temporary ID codes when the FBI is transmitted by two bits per slot.

As can be known from Tables 15 and 16, there are three types or forms of temporary ID code, "Long," "Medium," and "Short." Also, there can be 8 codes for each of the type. As in the related art, the temporary ID codes are required to be transmitted within one frame. However, if the space for sending a given ID code cannot be obtained within a frame, i.e. the ID code cannot be transmitted within a frame but must be split over two frames, bit(s) of the temporary ID code are punctured. In Tables 15 and 16 below, the bit(s) to be punctured in such cases are shown with brackets.

TABLE 15

| Identifier Label | Identifier Code | | | |
|---|---|---|---|---|
| | long | medium(8) | medium(7) | short |
| A | 000000000000000 | 00000000 | 0000000 | 00000 |
| B | 101010101010101 | 11111111 | 1010101 | 10010 |
| C | 011001100110011 | 01010101 | 0110011 | 01001 |
| D | 110011001100110 | 10101010 | 1100110 | 11011 |
| E | 000111100001111 | 00110011 | 0001111 | 00111 |
| F | 101101001011010 | 11001100 | 1011010 | 10101 |
| G | 011110000111100 | 01100110 | 0111100 | 01110 |
| H | 110100101101001 | 10011001 | 1101001 | 11100 |

In Table 15, long ID codes having a code length of 15 bits, which are generated by deleting the first bit from Hadamard codes having a code length of 16 bits, have a maximized minimum Hamming distance value of 8 ($d_{min}$=8). The medium ID codes of a code length of 8 bits based on the bi-orthogonal codes have a maximized minimum Hamming distance of 4 ($d_{min}$=4), while ID codes having a code length of 7 bits, which are generated by deleting the first bit from the Hadamard codes having a code length of 8 bits, have a maximized minimum Hamming distance value of 4 ($d_{min}$=4). The Short ID codes having a code length of 5 bits, which are generated by deleting the first, third and eighth bits from the Hadamard codes of 8 bits, have a maximized minimum Hamming distance value of 2 ($d_{min}$=2).

TABLE 16

| Identifier Label | Identifier Code (columns and rows request slot position and FBI bit position) | | | | |
|---|---|---|---|---|---|
| | long(16) | long(14) | medium(8) | medium(6) | short |
| A | 00000000 | 0000000 | 0000 | 000 | 000 |
| | 00000000 | 0000000 | 0000 | 000 | 000 |
| B | 11111111 | 0000000 | 1111 | 000 | 000 |
| | 11111111 | 1111111 | 1111 | 111 | 111 |
| C | 00000000 | 1010101 | 0000 | 101 | 101 |
| | 11111111 | 1010101 | 1111 | 101 | 101 |
| D | 11111111 | 1010101 | 1111 | 101 | 101 |
| | 00000000 | 0101010 | 0000 | 010 | 010 |
| E | 01010101 | 0110011 | 0101 | 011 | 011 |
| | 01010101 | 0110011 | 0101 | 011 | 011 |
| F | 10101010 | 0110011 | 1010 | 011 | 011 |
| | 10101010 | 1001100 | 1010 | 100 | 100 |
| G | 01010101 | 1100110 | 0101 | 110 | 110 |
| | 10101010 | 1100110 | 1010 | 110 | 110 |
| H | 10101010 | 1100110 | 1010 | 110 | 110 |
| | 01010101 | 0011001 | 0101 | 001 | 001 |

In table 16, long ID codes having a code length of 16 bits based on bi-orthogonal codes having a code length of 16 bits have a maximized minimum Hamming distance value of 8 ($d_{min}$=8). The long ID codes of a code length of 14 bits, which are generated by deleting two bits (first and second bits) of the Hadamard codes having a code length of 16 bits, have a maximized minimum Hamming distance value of 7 ($d_{min}$=7). The Medium ID codes having a code length of 8 bits based on the bi-orthogonal codes having a code length of 8 bits have a maximized minimum Hamming distance value of 4 ($d_{min}$=4). Medium ID codes having a code length of 6 bits, which are generated by deleting two bits (first and second bits) of the Hadamard codes having a code length of 8 bits, have a maximized minimum Hamming distance value of 3 ($d_{min}$=3). The Short ID codes having a code length of 6 bits based on the Hadamard codes have a maximized minimum Hamming distance value of 3 ($d_{min}$=3).

The temporary ID codes of the present invention, as shown in Tables 15 and 16, are generated based on the Hadamard codes having code lengths of 8 bits and 16 bits as shown in FIG. 3A. The temporary ID codes of the present invention, as shown in Tables 15 and 16, are also generated based on the bi-orthogonal codes having code lengths of 8 bits and 16 bits as shown in FIG. 3B.

In FIG. 3A, since the first bits of the Hadamard codes having code lengths of 8 bits and 16 bits are all "0," the minimum Hamming distance is not affected by the Hadamard codes even though the first bits of the Hadamard codes are deleted or punctured. Particularly, in the present invention, eight SSDT ID codes are used for each ID code type. Accordingly, eight Hadamard codes having a code length of 8 bits are used. In case of the Hadamard codes having a code length of 16 bits, eight upper or first half of the Hadamard codes are used.

The eight upper Hadamard codes having a code length of 16 bits have a bit value of 0 in the ninth bits. Accordingly, the minimum Hamming distance is not affected by the Hadamard codes even though the ninth bits are punctured as the case where the first bits are punctured. Thus, in the present invention, the long ID codes having a code length of 14 bits, generated by deleting the first bit and the ninth bit of the Hadamard codes having a code length of 16 bits, are also used as shown in Table 17 and will be described later.

In FIG. 3B, the bi-orthogonal codes having a code length of 8 bits and the bi-orthogonal codes having a code length of 16 bits are more useful than the Hadamard codes in view of the minimum Hamming distribution. In other words, for the bi-orthogonal codes having a code length of 8 bits, there exist four codes in which the Hamming distance and the code length are equal. For the bi-orthogonal codes having a code length of 16 bits, there also exists four codes in which the Hamming distance and the code lengths are equal.

Therefore, in the present invention, to generate eight medium ID codes having a code length of 8 bits when the FBI per slot is 1 bit, and to generate eight medium ID codes having a code length of 8 bits when the FBI per slot is 2 bits, the bi-orthogonal codes having a code length of 8 bits as shown in FIG. 3B are used. Also, to generate eight long ID codes having a code length of 16 bits when the FBI per slot is 2 bits, eight higher bi-orthogonal codes among 32 bi-orthogonal codes having a code length of 16 bits as shown in FIG. 3B are used. However, in other SSDT ID codes, the Hadamard codes of FIG. 3A are used.

A method for generating SSDT ID codes based on the Hadamard codes and the bi-orthogonal codes to maximize the minimum Hamming distance will be described below.

In the method for generating SSDT ID codes based on the Hadamard codes, it is considered that the first bits of the Hadamard codes having code lengths of 8 bits and 16 bits are all "0." Thus, even if the SSDT ID codes generated by puncturing the first bits of the Hadamard codes are transmitted, the minimum Hamming distance is maintained without being reduced. Moreover, in the method for generating SSDT ID codes based on the bi-orthogonal codes, it is considered that the bi-orthogonal codes having a code length of 8 bits or 16 bits are more useful than the Hadamard codes having the same code length as that of the bi-orthogonal codes in view of minimum Hamming distribution.

First, the method for generating the ID codes in case where the FBI per slot is 1 bit will be described.

Eight long ID codes having a code length of 15 bits are generated by deleting the first bits of eight Hadamard codes having a code length of 16 bits. In this case, the minimum Hamming distance has a maximum value of 8. Eight medium ID codes having a code length of 8 bits are generated using eight bi-orthogonal codes having a code length of 8 bits. In this case, the minimum Hamming distance has a maximum value of 4. Eight medium ID codes having a code length of 7 bits are generated by deleting the first bit of eight Hadamard codes having a code length of 8 bits. In this case, the minimum Hamming distance has a maximum value of 4.

Eight short ID codes having a code length of 5 bits are generated by deleting the first bits of eight Hadamard codes having a code length of 8 bits and then deleting optional two other bits. In this case, deletion bit patterns as shown in Tables 9, 10 and 11 of the first embodiment may be used, and the minimum Hamming distance has a maximum value of 2.

Among the 21 deletion position patterns in Tables 9, 10 and 11, when the first, second, and sixth bits of the eight Hadamard codes having a code length of 8 bits are deleted to generate the eight short ID codes, an optimal performance can be obtained. Furthermore, in the present invention, as some short ID codes of Table 9, the first and second bits of the Hadamard codes having a code length of 8 bits are deleted and then the other 1 bit is deleted in six patterns such as position patterns (1,2,3) (1,2,4) (1,2,5) (1,2,6) (1,2,7) (1,2,8) such that the short ID codes having a code length of 5 bits are generated.

In generating the ID codes of 5 bits or 6 bits by deleting the first and second bits of the Hadamard codes of 8 bits, the ID codes can be generated by a common deletion pattern by deleting the first bits and the second bits to insert 1 bit or 2 bits into the FBI field per slot. Thus, hardware which will be used for decoding at the receiving party can be obtained simply.

The method for generating the ID codes in case where the FBI per slot is 2 bits will be described.

Eight long ID codes having a code length of 16 bits are generated using eight bi-orthogonal codes having a code length of 16. In this case, the minimum Hamming distance has a maximum value of 8. Eight long ID codes having a code length of 14 bits are generated by deleting the first and second bits of the Hadamard codes having a code length of 16 bits. In this case, the minimum Hamming distance has a maximum value of 7.

Eight medium ID codes having a code length of 8 bits are generating using eight bi-orthogonal codes having a code length of 8 bits. In this case, the minimum Hamming distance has a maximum value of 4. Eight medium ID codes having a code length of 6 bits are generated by deleting the first and second bits of eight Hadamard codes having a code length of 8 bits. In this case, the minimum Hamming distance has a maximum value of 3. Eight short ID codes having a code length of 6 bits are also generated by deleting the first and second bits of the eight Hadamard codes having a code length of 8 bits. In this case, the minimum Hamming distance is 3.

In the present invention, when the FBI per slot is 2 bits, the SSDT ID codes generated by puncturing the first and second bits of the eight Hadamard codes having a code length of 16 bits can additionally be used, as shown in Table 17.

TABLE 17

| Identifier Label | Identifier Code (columns and rows request slot position and FBI bit position) | | | | |
|---|---|---|---|---|---|
| | long(16) | long(14) | medium(8) | medium(6) | short |
| A | 00000000 | 0000000 | 0000 | 000 | 000 |
|   | 00000000 | 0000000 | 0000 | 000 | 000 |
| B | 11111111 | 1111000 | 1111 | 000 | 000 |
|   | 11111111 | 0001111 | 1111 | 111 | 111 |
| C | 00000000 | 0101101 | 0000 | 101 | 101 |
|   | 11111111 | 1010101 | 1111 | 101 | 101 |
| D | 11111111 | 1010101 | 1111 | 101 | 101 |
|   | 00000000 | 1011010 | 0000 | 010 | 010 |

TABLE 17-continued

| Identifier Label | Identifier Code (columns and rows request slot position and FBI bit position) | | | | |
|---|---|---|---|---|---|
| | long(16) | long(14) | medium(8) | medium(6) | short |
| E | 01010101 | 0011011 | 0101 | 011 | 011 |
| | 01010101 | 0110011 | 0101 | 011 | 011 |
| F | 10101010 | 1100011 | 1010 | 011 | 011 |
| | 10101010 | 0111100 | 1010 | 100 | 100 |
| G | 01010101 | 0110110 | 0101 | 110 | 110 |
| | 10101010 | 1100110 | 1010 | 110 | 110 |
| H | 10101010 | 1001110 | 1010 | 110 | 110 |
| | 01010101 | 1101001 | 0101 | 001 | 001 |

In Table 17, the long ID codes having a code length of 14 bits are generated by deleting the first bit and the ninth bit of the Hadamard codes having a code length of 16 bits, and have a maximized minimum Hamming distance value of 8 ($d_{min}$=8). In this case, it is more useful than the case where the long ID codes having a code length of 14 bits are generated by deleting the first and second bits of the Hadamard codes having a code length of 16 bits, as shown in Table 16, which has a maximized minimum Hamming distance value of 7.

A UE periodically measures received power levels of pilots transmitted by active cells of the UE, so that a cell having a received level greater than a threshold value is selected as a primary cell. One of the temporary ID codes is determined as a primary cell ID code to be periodically transmitted to active cells within an active set. The primary cell ID code is transmitted through the FBI field of an uplink control channel. At this time, the temporary ID codes are inserted into the FBI by 1 bit or 2 bits and then transmitted, and the number of the bits of the ID codes which will be inserted into the FBI field per slot is determined by the UE.

Figure 4A:
FIGS. 4A to 4C show various examples of the cell ID codes when the ID codes are inserted into the FBI field 1 bit per slot, in the second and third embodiments of the present invention.
Figure 4B:
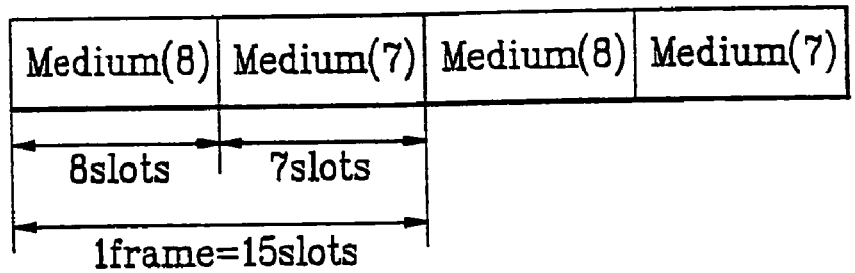
Figure 4C:
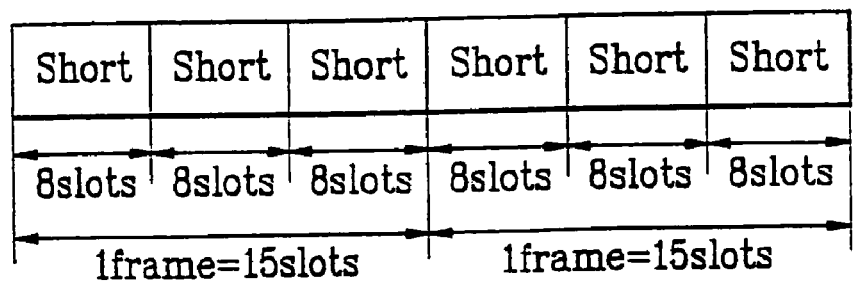

The transmission procedure of the generated SSDT ID codes will be described. FIGS. 4A to 4C show various examples of cell ID codes in case where the SSDT ID codes are inserted into the FBI field 1 bit per slot.

In FIG. 4A, the long ID codes having a code length of 15 bits are transmitted by one frame. One of the eight ID codes having a code length of 15 bits as shown in Table 15 is selected by the UE and inserted into the FBI field of each slot by 1 bit. In this case, an opportunity of selecting a site to select the primary cell per frame is one time.

In FIG. 4B, the medium ID codes having a code length of 8 bits and the medium ID codes having a code length of 7 bits are transmitted together by one frame. One of the eight ID codes having a code length of 8 bits as shown in Table 15 is selected by the UE and inserted into the FBI field of the first eight slots by 1 bit. Thereafter, one of the eight ID codes having a code length of 7 bits as shown in Table 15 is selected and inserted into the FBI field of the remaining seven slots by 1 bit. In this case, an opportunity of selecting a site to select the primary cell per frame is two times.

In FIG. 4C, the short ID codes having a code length of 5 bits are transmitted three times by one frame. One of the eight ID codes having a code length of 5 bits as shown in Table 15 is selected by the UE and is repeatedly inserted into the FBI field of five slots by 1 bit. Accordingly, in this case, an opportunity of selecting a site to select the primary cell per frame is three times.

Figure 5A:
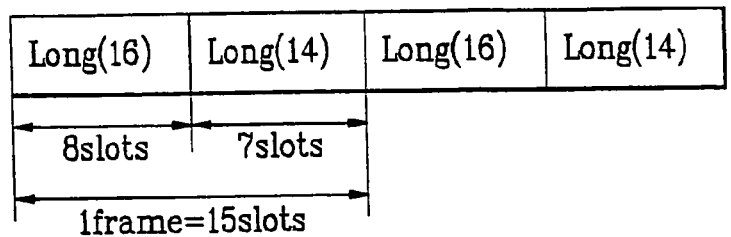
FIGS. 5A to 5C show various examples of cell ID codes when the ID codes are inserted into the FBI field 2 bits per slot, in the second and third embodiments of the present invention.
Figure 5B:
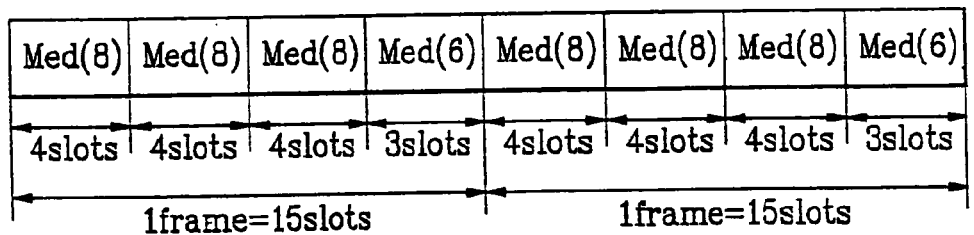
Figure 5C:
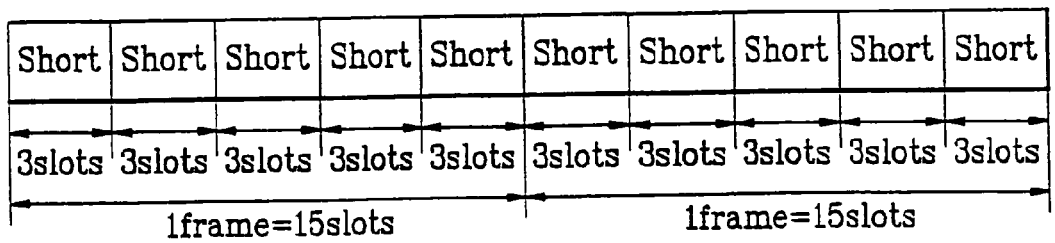

FIGS. 5A to 5C show various examples of cell identification codes in case where the SSDT ID codes are inserted into the FBI field 2 bits per slot.

In FIG. 5A, the long ID codes having a code length of 16 bits and the long ID codes having a code length of 14 bits are transmitted together by one frame. One of the eight ID codes having a code length of 16 bits shown in Table 16 is selected by the UE and inserted into the FBI field of the first eight slots by 2 bits for each column. One of the eight ID codes having a code length of 14 bits shown in Table 16 is then selected by the UE and inserted into the FBI field of remaining seven slots by 2 bits for each column. Accordingly, in this case, an opportunity of selecting a site to select the primary cell per frame is two times.

In FIG. 5B, the medium ID codes having a code length of 8 bits and the medium ID codes having a code length of 6 bits are transmitted together by one frame. One of the eight ID codes having a code length of 8 bits shown in Table 16 is selected by the UE and is repeatedly inserted three times into each FBI field of four slots for a total of twelve slots by 2 bits. One of the eight ID codes having a code length of 6 bits shown in Table 16 is then selected and inserted into each FBI field of the remaining three slots by 2 bits. In this case, an opportunity of selecting a site to select the primary cell per frame is four times.

In FIG. 5C, the short ID codes having a code length of 6 bits are transmitted five times by one frame. One of the eight ID codes having a code length of 6 bits shown in Table 16 is selected by the UE and is successively inserted into each FBI field of three slots by 2 bits. Accordingly, in this case, an opportunity of selecting a site to select the primary cell per frame is five times.

Table 18 shows performance gain of the present invention in comparison to existing performance gain for each ID code types.

TABLE 18

| AWGN Channel | case where FBI per slot is 1 bit | | | | case where FBI per slot is 2 bit | | | | |
|---|---|---|---|---|---|---|---|---|---|
| | long (15) | medium (8) | medium (7) | short (5) | long (16) | long (14) | medium (8) | medium (6) | short (6) |
| conventional | 0 | 0 | 0 | 0 | 0 | 0 | 0 | 0 | 0 |
| present invention | 0.3 | 0 | 0.7 | 0.25 | 0 | 0.25 | 0 | 0.8 | 0.8 |

The performance gain of Table 18 is obtained based on the SSDT ID codes having a code length 14 bits generated by deleting the first and second bits of the Hadamard codes having a code length of 16 bits, in case where the FBI per slot is 2 bits. To complement the performance gain of Table 18, the performance gain of Table 19 is obtained based on the long ID codes having a code length of 14 bits generated by deleting the first bit and the ninth bit of the Hadamard codes having a code length of 16 bits as shown in Table 17.

TABLE 19

|  | case where FBI per slot is 1 bit | | | | case where FBI per slot is 2 bit | | | | |
| --- | --- | --- | --- | --- | --- | --- | --- | --- | --- |
| AWGN Channel | long (15) | medium (8) | medium (7) | short (5) | long (16) | long (14) | medium (8) | medium (6) | short (6) |
| Conventional | 0 | 0 | 0 | 0 | 0 | 0 | 0 | 0 | 0 |
| present invention | 0.3 | 0 | 0.7 | 0.25 | 0 | 0.3 | 0 | 0.8 | 0.8 |

Table 20 shows performance gain of the present invention in comparison to existing performance gain for each ID code types.

TABLE 20

|  | case where FBI per slot is 1 bit | | | | case where FBI per slot is 2 bit | | | | |
| --- | --- | --- | --- | --- | --- | --- | --- | --- | --- |
| AWGN Channel | long (15) | medium (8) | medium (7) | short (5) | long (16) | long (14) | medium (8) | medium (6) | short (6) |
| Conventional | 0 | 0 | 0 | 0 | 0 | 0 | 0 | 0 | 0 |
| present invention | 1.5 | 1.0 | 1.0 | 1.5 | 1.2 | 1.3 | 0.8 | 2.0 | 2.0 |

The performance gain of Table 20 is obtained based on the SSDT ID codes having a code length 14 bits generated by deleting the first and second bits of the Hadamard codes having a code length of 16 bits, in case where the FBI per slot is 2 bits. To complement the performance gain of Table 20, the performance gain of Table 21 is obtained based on the long ID codes having a code length of 14 bits generated by deleting the first bit and the ninth bit of the Hadamard codes having a code length of 16 bits as shown in Table 17.

TABLE 21

|  | case where FBI per slot is 1 bit | | | | case where FBI per slot is 2 bit | | | | |
| --- | --- | --- | --- | --- | --- | --- | --- | --- | --- |
| AWGN Channel | long (15) | medium (8) | medium (7) | short (5) | long (16) | long (14) | medium (8) | medium (6) | Short (6) |
| Conventional | 0 | 0 | 0 | 0 | 0 | 0 | 0 | 0 | 0 |
| present invention | 1.5 | 1.0 | 1.0 | 1.5 | 1.2 | 2.2 | 0.8 | 2.0 | 2.0 |

In the second embodiment, the temporary ID codes may be used during the SSDT. The temporary ID codes may also be used when the UE desires to transmit its own cell data to the UTRAN. In this case, the temporary ID codes can be optimized for the cross correlation characteristics and the Hamming distance.

The third embodiment of the present invention will now be explained. Temporary cell IDs are provided for each unit of a binary bit sequence having a specific bit code length, and temporary cell ID codes suggested in the third embodiment are shown in Tables 22 and 23 below. Namely, Table 22 shows temporary ID codes when the FBI is transmitted by one bit per slot, and Table 22 shows temporary ID codes when the FBI is transmitted by two bits per slot.

As can be known from Tables 22 and 23, there are three types or forms of temporary ID code, "Long," "Medium," and "Short." Also, there can be 8 codes for each of the type.

As in the related art, the temporary ID codes are required to be transmitted within one frame. However, if the space for sending a given ID code cannot be obtained within a frame, i.e. the ID code cannot be transmitted within a frame but must be split over two frames, bits of the temporary ID code are punctured. In Tables 22 and 23 below, the bit(s) to be punctured in such cases are shown with brackets.

TABLE 22

| Identifier | Identifier Code | | |
| --- | --- | --- | --- |
| Label | Long | medium | short |
| A | 00000000000000 | (0)0000000 | 00000 |
| B1 | 11111111111111 | (1)1111111 | 11111 |
| B2 | 10101010101010 | (0)1010101 | 01001 |
| C | 01100110011001 | (0)0110011 | 11011 |
| D | 11001100110011 | (0)1100110 | 10010 |
| E | 00011110000111 | (0)0001111 | 00111 |
| F | 10110100101101 | (0)1011010 | 01110 |
| G | 01111000011110 | (0)0111100 | 11100 |
| H | 11010010110100 | (0)1101001 | 10101 |

TABLE 23

| Identifier Label | Identifier Code (columns and rows represent slot position and FBI bit Position) | | |
|---|---|---|---|
| | Long | medium | short |
| A | (0)0000000 | (0)000 | 000 |
|   | (0)0000000 | (0)000 | 000 |
| B1 | (1)1111111 | (1)111 | 111 |
|    | (1)1111111 | (1)111 | 111 |
| B2 | (0)0000000 | (0)000 | 000 |
|    | (1)1111111 | (1)111 | 111 |
| C | (0)1010101 | (0)101 | 101 |
|   | (0)1010101 | (0)101 | 101 |
| D | (0)1010101 | (0)101 | 101 |
|   | (1)0101010 | (1)010 | 010 |
| E | (0)0110011 | (0)011 | 011 |
|   | (0)0110011 | (0)011 | 011 |
| F | (0)0110011 | (0)011 | 011 |
|   | (1)1001100 | (1)100 | 100 |
| G | (0)1100110 | (0)110 | 110 |
|   | (0)1100110 | (0)110 | 110 |
| H | (0)1100110 | (0)110 | 110 |
|   | (1)0011001 | (1)001 | 001 |

In Tables 22 and 23, the minimum Hamming distances for ID codes having each code length will be described later.

Referring to Tables 22 and 23, the temporary ID codes corresponding to ID labels A, B2, C, D, E, F, G, and H are generated based on the Hadamard codes having a code length of 8 bits and the Hadamard codes having a code length of 16 bits shown in FIG. 3A. In FIG. 3A, first bits of both the Hadamard codes having a code length of 8 bits and the Hadamard codes having a code length of 16 bits have bit values of 0. Accordingly, the minimum Hamming distance is not affected by the Hadamard codes even if the first bit is deleted or punctured.

Particularly, in the present invention, since eight SSDT ID codes are used depending on ID code types, eight Hadamard codes having a code length of 8 bits and eight Hadamard codes having a code length of 16 bits are used. Long ID codes having a code length of 14 bits are generated by puncturing the first and second bits of long ID codes having a code length of 16 bits, in case where the FBI is transmitted 2 bits per slot.

Also, the temporary ID codes corresponding to ID labels A and B1 as shown in Tables 22 and 23 may selectively be generated based on some of the bi-orthogonal codes having code lengths of 8 bits and 16 bits as shown below.

$B_{3,0}$=0000 0000
$B_{3,1}$=1111 1111
$B_{4,0}$=0000 0000 0000 0000
$B_{4,1}$=1111 1111 1111 1111

In the present invention, the respective temporary ID codes of Tables 22 and 23 are generated as follows. First, the temporary ID codes of the ID labels A, B2, C, D, E, F, G, and H generated based on the Hadamard codes will be described.

The temporary ID codes of the ID labels A, B2, C, D, E, F, G, and H are allocated to the active cells belonging to the active set by the UE in case where the number of cells belonging in the active set, i.e. the size of the active set, is between 3 and 8. In Table 22, the FBI per slot is 1 bit, and the temporary ID codes allocated in case where the size of the active set is between 3 and 8 are generated as follows.

Eight long ID codes having a code length of 15 bits are generated by deleting the first bit of the Hadamard codes having a code length of 16 bits. Eight medium ID codes having a code length of 8 bits are generating using the Hadamard codes having a code length of 8 bits. ID codes having a code length of 7 bits, which are transmitted by being inserted into one frame together with the eight medium ID codes having a code length of 8 bits, are generated by puncturing the first bits of the eight Hadamard codes having a code length of 8 bits. Eight short ID codes having a code length of 5 bits are generated by deleting the first bits of the Hadamard codes having a code length of 8 bits and then further deleting the two other bits in the same manner as the 21 patterns shown in Tables 9, 10, and 11.

Also, in the third embodiment of the present invention, the 21 patterns are selectively used in the same manner as the first and second embodiments. However, position patterns (1,2,3) (1,2,4) (1,2,5) (1,2,6) (1,2,7) (1,2,8) are preferred, by which the first and second bits of the Hadamard codes having a code length of 8 bits are deleted in the same manner as some of the short ID codes of Table 9 and 1 other bit is deleted in six patterns. Therefore, the ID codes having a code length of 5 bits are generated by deleting the first and second bits of the Hadamard codes having a code length of 8 bits and by deleting another bit.

The generated 21 short ID codes having a code length of 5 bits have the same minimum Hamming distance. However, the respective 21 short ID codes have different performances depending on Doppler frequencies. Thus, in the present invention, the short ID codes of the position pattern (1,2,6) is used among the 21 patterns. Namely, the short ID codes generated by deleting the first, second, and sixth bits of the Hadamard codes having a code length of 8 bits used among the 21 short ID codes.

Referring to Table 23, the temporary ID codes, allocated in case where the FBI per slot is 2 bits and the size of the active set is between 3 and 8, are generated as follows.

Eight long ID codes having a code length of 16 bits are generated using the Hadamard codes having a code length of 16 bits. The long ID codes having a code length of 14 bits, which are transmitted by being inserted into one frame together with the eight long ID codes having a code length of 16 bits, are generated by puncturing the first and second bits of the eight Hadamard codes having a code length of 16 bits.

Eight medium ID codes having a code length of 8 bits are generated using the Hadamard codes having a code length of 8 bits. The medium ID codes having a code length of 6 bits, which are transmitted by being inserted into one frame together with the eight medium ID codes having a code length of 8 bits, are generated by puncturing the first and second bits of the eight Hadamard codes having a code length of 8 bits. Eight short ID codes having a code length of 6 bits are generated by deleting the first and second bits of the Hadamard codes having a code length of 8 bits.

The UE determines one of the SSDT ID codes generated as described above as a primary cell ID code and periodically transmits a corresponding primary cell ID code to the active cells belonging to the active set through the FBI field of the uplink control channel.

The temporary ID codes of the ID labels A and B1 generated based on the bi-orthogonal codes will next be described. The temporary ID codes of the ID labels A and B1 are allocated to two or less active cells belonging to the active set by the UE in case where the number of cells belonging to the active set, i.e. the size of the active set, is two or less.

In Table 22, the FBI per slot is 1 bit, and the temporary ID codes allocated in case where the size of the active set is two or less are generated as follows.

Two long ID codes having a code length of 15 bits are generated by deleting the first bit of the above bi-orthogonal codes having a code length of 16 bits. Here, since all bit values of the respective codes are 0 or 1, any bit may be deleted. However, if the first bit is deleted, there is an advantage due to similarity with a deletion algorithm used when the Hadamard codes are punctured. Also, the ID code having the ID label B1 is orthogonal to the ID label A.

Two medium ID codes having a code length of 8 bits are generated using the bi-orthogonal codes having a code length of 8 bits. The ID codes having a code length of 7 bits, which are transmitted by being inserted into one frame together with the two medium ID codes having a code length of 8 bits, are generated by puncturing the first bits of two bi-orthogonal codes having a code length of 8 bits. In this case, since all of bit values of the respective codes are also 0 or 1, any bit may be punctured. However, if the first bit is punctured, there is an advantage due to similarity with a puncturing algorithm used when the Hadamard codes are punctured.

Two short ID codes having a code length of 5 bits are generated by deleting the first bit of the bi-orthogonal codes having a code length of 8 bits and deleting two other bits in the same manner as the 21 patterns of the Hadamard codes. In this case, to have similarity with a deletion algorithm used when the Hadamard codes are deleted, the short ID codes of the position pattern (1,2,6), by which the first, second and sixth bits of the bi-orthogonal codes having a code length of 8 bits are deleted, among the 21 short ID codes are first selected and used.

In Table 23, the FBI per slot is 2 bits, and the temporary ID codes allocated in case where the size of the active set is two or less are generated as follows. In this case, the temporary ID codes are also generated considering the similarity with a deleting and puncturing algorithm when the Hadamard codes are deleted or punctured.

First, two long ID codes having a code length of 16 bits are generated using the bi-orthogonal codes having a code length of 16 bits. The ID codes having a code length of 14 bits, which are transmitted by being inserted into one frame together with the two long ID codes having a code length of 16 bits, are generated by puncturing the first and second bits of two bi-orthogonal codes having a code length of 16 bits.

Two medium ID codes having a code length of 8 bits are generated using the bi-orthogonal codes having a code length of 8 bits. The ID codes having a code length of 6 bits, which are transmitted by being inserted into one frame together with the two medium ID codes having a code length of 8 bits, are generated by puncturing the first and second bits of the two bi-orthogonal codes having a code length of 8 bits. Two short ID codes having a code length of 6 bits are generated by deleting the first and second bits of the two bi-orthogonal codes having a code length of 8 bits.

The UE periodically measures received power levels of pilots transmitted by the active cells of the UE, so that a cell having a received power level greater than a threshold value is selected as a primary cell. The UE determines one of the SSDT ID codes as a primary cell ID code and periodically transmits the same to two cells within the active set. The primary cell ID code is transmitted through the FBI field of the uplink control channel. At this time, the temporary ID codes are inserted into the FBI by 1 bit or 2 bits and then transmitted.

The operation of transmitting the generated SSDT ID codes will now be described.

SSDT services are started by the UTRAN based on the cells of the active set at the time when the UE is operated in a soft handover mode. Afterwards, the UTRAN of the SSDT option activated during the current soft handover period informs the cells and the UE of the SSDT services. Thus, the UE allocates the generated ID codes to the active cells depending on the size of the active set. Allocation of the SSDT ID codes is released at the time when the soft handover mode of the UE ends.

Examples of allocation techniques of the ID codes include a static allocation technique and a dynamic allocation technique.

In the static allocation technique, assume that the UE previously allocates static ID codes of A, B2, and C in Table 22 or 23 to the cells belonging to the active set among peripheral cells at the time of the soft handover mode. Then, if a cell belonging to the active set are changed, the UE allocates a new ID codes such as corresponding to D in Table 22 or 23 to new cells belonging to the active set. The ID code (for example, B2) which has been previously allocated to a previous cells remains as a redundant code to be later allocated to other cells.

However, in the dynamic allocation technique, assuming that the UE previously allocates the ID codes of A, B2, and C in Table 22 or 23 to the cells belonging to the active set among peripheral cells at the time of the soft handover mode, if the cells belonging to the active set are changed, the UE allocates the ID codes allocated to previous cells to new cells belonging to the active set.

Both the static allocation technique and the dynamic allocation technique of the present invention can obtain an optimal performance. The dynamic allocation technique can be used more effectively in view of system operation.

Also, in the present invention, depending on the number of the cells belonging to the active set, the ID codes generated based on the Hadamard codes may be allocated (if the size of the active set is between 3 and 8), or two ID codes generated based on the bi-orthogonal codes may be allocated (if the size of the active set is 2 or less).

FIGS. 4A to 4C show various examples of the cell ID codes allocated by the UE in case where the ID codes are inserted into the FBI field 1 bit per slot.

In FIG. 4A, the long ID codes having a code length of 15 bits are transmitted by one frame. One of the eight ID codes of ID labels (A, B2, C, D, E, F, G, and H) having a code length of 15 bits based on the Hadamard codes or one of the two ID codes of ID labels (A and B1) having a code length of 15 bits based on the bi-orthogonal codes is selected by the UE and then is inserted into the FBI field of each slot by 1 bit. In this case, an opportunity of selecting a site that can select the primary cell per frame is one time.

In FIG. 4B, the medium ID codes having a code length of 8 bits and the medium ID codes having a code length of 7 bits are transmitted together by one frame. One of the eight ID codes of ID labels (A, B2, C, D, E, F, G, and H) having a code length of 8 bits based on the Hadamard codes or one of the two ID codes of ID labels (A and B1) having a code length of 8 bits based on the bi-orthogonal codes is selected by the UE and then is inserted into the FBI field of first eight slots by 1 bit. Thereafter, one of the eight ID codes of ID labels (A, B2, C, D, E, F, G, and H) having a code length of 7 bits based on the Hadamard codes or one of the two ID codes of ID labels (A and B1) having a code length of 7 bits based on the bi-orthogonal codes is selected and then inserted into the FBI field of the remaining seven slots by 1 bit. In this case, an opportunity of selecting a site that can select the primary cell per frame is two times.

In FIG. 4C, the short ID codes having a code length of 5 bits are transmitted three times by one frame. One of the eight ID codes of ID labels (A, B2, C, D, E, F, G, and H) having a code length of 5 bits based on the Hadamard codes or one of the two ID codes of ID labels (A and B1) having a code length of 5 bits is selected by the UE and then is repeatedly inserted into each FBI field of five slots by 1 bit. Accordingly, in this case, an opportunity of selecting a site that can select the primary cell per frame is three times.

FIGS. 5A to 5C show various examples of cell ID codes allocated to the UE in case where the ID codes are inserted into the FBI field per slot by 2 bits.

In FIG. 5A, the long ID codes having a code length of 16 bits and the long ID codes having a code length of 14 bits are transmitted together by one frame. Depending on the size of the active set, one of the eight ID codes having a code length of 16 bits based on the Hadamard codes shown in Table 23 or one of the two ID codes having a code length based on the bi-orthogonal codes is selected by the UE and then is inserted into the FBI field of first eight slots by 2 bits for each column. One of the eight ID codes having a code length of 14 bits based on the Hadamard codes shown in Table 23 or one of the two ID codes having a code length 14 bits based on the bi-orthogonal codes is selected by the UE and then is inserted into the FBI field of the other seven slots by 2 bits for each column. Accordingly, in this case, an opportunity of selecting a site that can select the primary cell per frame is two times.

In FIG. 5B, the medium ID codes having a code length of 8 bits and the medium ID codes having a code length of 6 bits are transmitted together by one frame. Depending on the size of the active set, one of the eight ID codes having a code length of 8 bits based on the Hadamard codes shown in Table 23 or one of the two ID codes having a code length of 8 bits based on the bi-orthogonal codes is selected by the UE and then is repeatedly inserted three times into each FBI field of four slots for a total of first twelve slots by 2 bits for each column. One of the eight ID codes having a code length of 6 bits based on the Hadamard codes shown in Table 23 or one of the two ID codes having a code length of 6 bits based on the bi-orthogonal codes is selected and then inserted into each FBI field of the other three slots by 2 bits. In this case, an opportunity of selecting a site that can select the primary cell per frame is four times.

In FIG. 5C, the short ID codes having a code length of 6 bits are transmitted five times by one frame. Depending on the size of the active set, one of the eight ID codes having a code length of 6 bits based on the Hadamard codes shown in Table 23 or one of the two ID codes having a code length of 6 bits based on the bi-orthogonal codes is selected by the UE and then is repeatedly inserted into each FBI field of three slots by 2 bits. Accordingly, in this case, an opportunity of selecting a site that can select the primary cell per frame is five times.

The transmission of the cell ID codes allocated by the UE have a minimum Hamming distance having a maximum value based on the dynamic allocation technique. Examples of optimal allocation of the SSDT ID codes will be described based on the aforementioned dynamic allocation technique.

For example, assume that the UE allocates the ID codes, based on the bi-orthogonal codes corresponding to the ID labels A and B1 in Table 22 or 23, to the respective cells belonging to the active set, in case the number of cells belonging to the active set is 2 at the time of the soft handover mode. Then, if the number of cells belonging to the active set increases to 3, the UE allocates the ID codes based on the Hadamard codes corresponding to the ID labels A, B2 and C in Table 22 or 23 to the three active cells belonging to the active set.

In another example, assume that the UE allocates the ID codes, based on the bi-orthogonal codes corresponding to the ID labels A and B1 in Table 22 or 23, to two active cells belonging to the active set in case where the size of the active set is 2 at the time of the soft handover mode. Then, if the number of the effective cells of the active set is not increased but the cells belonging to the active set are changed, the UE allocates the ID codes allocated to the previous cell(s) to new cell(s) belonging to the active set. This is based on the dynamic allocation technique. In case of the static allocation technique, one of the ID codes based on the Hadamard codes would be selected and allocated to the new cells belonging to the active set.

Assuming now that the UE allocates the ID codes, based on the bi-orthogonal codes corresponding to the ID labels A and B1 in Table 22 or 23, to the respective cells belonging to the active set, in case where the number of the cells belonging to the active set is 2 at the time of the soft handover mode. Then, if the number of the active cells belonging to the active set increases to 3, the UE allocates the ID codes based on the Hadamard codes corresponding to the ID labels A, B2 and C in Table 22 or 23 to the three active cells belonging to the active set.

Afterwards, if the number of the active cells belonging to the active set increases, the ID codes which had not been allocated among the ID codes based on the Hadamard codes in Table 22 or 23, are respectively allocated to new effective cells belonging to the active set. On the other hand, if the number of the active cells belonging to the active set decreases to back to 2, the UE respectively allocates the ID codes based on the bi-orthogonal codes corresponding to the ID labels A and B1 in Table 22 or 23 to the two active cells belonging to the active set.

Table 24 shows code types of the present invention depending on the size of the active set of the UE when the SSDT cell ID codes are allocated based on the dynamic allocation technique.

TABLE 24

| size of active set | 2 or less | 3~8 |
|---|---|---|
| code type | b-orthogonal | orthogonal code (Hadrmad code) |

Table 25 shows a minimum Hamming distance of the SSDT temporary ID codes depending on the size of the active set suggested in the present invention in case where the FBI per slot is 1 bit. Table 26 shows a minimum Hamming distance of the SSDT temporary ID codes depending on the size of the active set suggested in the present invention in case where the FBI per slot is 2 bits. In Tables 25 and 26, numbers in parentheses are minimum Hamming distances when the ID codes are generated by puncturing.

TABLE 25

| | Identifier Code | | |
|---|---|---|---|
| size of Active set | long | medium | short |
| 2 or less | 15 | 8(7) | 5 |
| 3~8 | 8 | 4 | 2 |

TABLE 26

| size of Active set | Identifier Code | | |
|---|---|---|---|
| | Long | medium | short |
| 2 or less | 16(14) | 8(6) | 6 |
| 3~8 | 8(7) | 4(3) | 3 |

As described above, the method for generating and transmitting optimal cell ID codes according to the present invention has the following advantages.

In the first embodiment, the temporary ID codes may be used during the SSDT. The temporary ID codes may also be used when the UE desires to transmit its own cell data to the UTRAN. In this case, the temporary ID codes can be optimized for the cross correlation characteristics and the Hamming distance. The SSDT temporary codes generated based on the Hadamard codes are applicable to a compressed mode and a normal mode. Particularly, the SSDT temporary codes have more excellent performance in the compressed mode. In the compressed mode, the data are partially removed. In this case, the Hamming distance characteristics of the respective codes are more susceptible to the data transmission performance. Accordingly, the present invention can be used more usefully.

In the second embodiment, since the respective cells are identified in the SSDT by combining and generating the cell ID codes based on the Hadamard codes and the bi-orthogonal codes, use of the ID codes having a period of high speed can be maximized, thereby maximizing system performance in the fading channel and the AWGN channel. Furthermore, in receiving the cell ID codes according to the present invention to decode them, bits punctured at the transmitting party can be recognized in advance by the receiving party. Accordingly, decoding gain can be obtained. In addition, in the present invention, the cell ID codes are generated to have a minimum Hamming distance with a maximum value and a small absolute value of the maximum correlation function by combining the Hadamard codes and the bi-orthogonal codes. Thus, optimal diversity performance can be obtained in the soft handover mode.

In the third embodiment, since the respective cells are identified in the SSDT by generating the cell ID codes based on the Hadamard codes or the bi-orthogonal codes and then selectively allocating them to the effective cells of the active set, use of the ID codes having a period of high speed can be maximized, thereby maximizing system performance in the fading channel and the AWGN channel. Furthermore, since the Hadamard codes or the bi-orthogonal codes are selectively allocated depending on the size of the active set, the absolute value of the maximum cross correlation function is small and the minimum Hamming distance has a maximum value. Thus, optimal diversity performance can be obtained in the soft handover mode.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

The invention claimed is:

1. A method for allocating cell ID codes in a mobile communication system of a cellular mode comprising:
   generating ID codes using Hadamard codes; and
   allocating the generated ID codes to cells which require ID codes, wherein the ID codes are generated by deleting or puncturing at least one bit of the Hadamard codes.

2. The method of claim 1, wherein generating the ID codes either by deleting or puncturing first bit of the Hadamard codes.

3. The method of claim 1, wherein generating the ID codes either by deleting or puncturing first and second bits of the Hadamard codes.

4. The method of claim 1, wherein generating the ID codes by deleting first, second and sixth bits of the Hadamard codes.

5. The method of claim 1, further comprising:
   selecting Hadamard codes in which the first bit of the second half of a code has a bit value of 0; and
   generating the ID codes using the selected Hadamard codes.

6. The method of claim 5, wherein generating the ID codes either by deleting or puncturing first bit the Hadamard codes.

7. The method of claim 5, wherein generating the ID codes either by deleting or puncturing first and second bits of the Hadamard codes.

8. The method of claim 5, wherein generating the ID codes by deleting first, second and sixth bits of the Hadamard codes.

9. The method of claim 1, wherein the Hadamard codes have code bit lengths of either 8 or 16.

10. A method of selecting an identification code of a primary cell by a user equipment, comprising:
    selecting the primary cell among a plurality of cells based on a measurement of common pilot signals received from the cells; and
    selecting the identification code from one of modified Hadamard codes, wherein each modified Hadamard code comprises a Hadamard code where at least one bit is not used or has been deleted.

11. The method of claim 10, wherein the identification code of the primary cell is selected from one of the following:

| Identification label | Identification code "long" |
|---|---|
| a | 000000000000000 |
| b | 101010101010101 |
| c | 011001100110011 |
| d | 110011001100110 |
| e | 000111100001111 |
| f | 101101001011010 |
| g | 011110000111100 |
| h | 110100101101001. |

12. The method of claim 10, wherein the identification code of the primary cell is selected from one of the following:

| Identification label | Identification code "short" |
|---|---|
| A | 00000 |
| B | 01001 |
| c | 11011 |
| d | 10010 |

-continued

| Identification label | Identification code "short" |
|---|---|
| e | 00111 |
| f | 01110 |
| g | 11100 |
| h | 10101. |

13. The method of claim 10, wherein the identification code of the primary cell is selected from one of the following:

| Identification label | Identification code "short" |
|---|---|
| a | 000 |
|   | 000 |
| b | 000 |
|   | 111 |
| c | 101 |
|   | 101 |
| d | 101 |
|   | 010 |
| e | 011 |
|   | 011 |
| f | 011 |
|   | 100 |
| g | 110 |
|   | 110 |
| h | 110 |
|   | 001. |

14. The method of claim 10 or 11, wherein the first bit of each Hadamard code is not used or has been deleted to form the modified Hadamard codes.

15. The method of claim 14, wherein the each Hadamard code comprises 16 bits, and deletion is performed by puncturing.

16. The method of claims 10, wherein the first bit and at least one other bit of each Hadamard code are not used or have been deleted to form the modified Hadamard codes.

17. The method of claim 16, wherein the at least one other bit is the second and sixth bits.

18. The method of claim 17, wherein each Hadamard code is 8 bits, and deletion is performed by puncturing.

19. The method of claim 16, wherein the at least one other bit is a second bit of each Hadamard code.

20. The method of claim 19, wherein each Hadamard code is 8 bits, and deletion is performed by puncturing.

21. The method of claim 10, 11, or 12 wherein the selected identification code bits are transmitted within a radio frame structure.

22. The method of claim 21, wherein the radio frame structure comprises 15 slots, and the corresponding selected identification code bit is provided in a 1 bit feedback identifier (FBI) field of the slot.

23. The method of claim 10 or 13, wherein the selected identification code bits are transmitted within a radio frame structure, which comprises 15 slots, the corresponding selected identification code bits are provided in a 2 bit feedback identifier (FBI) field of the slot.

24. The method of claim 10, wherein a user equipment (UE) periodically sends the selected identification code of the primary cell via a portion of an uplink feedback indicator (FBI) field.

25. A method of sending an identification code of a primary cell by a user equipment, comprising:
   selecting the primary cell among a plurality of cells based on a measurement of common pilot signals received from the cells;
   selecting the identification code from one of a plurality of codes, wherein each identification code comprises a binary bit sequence, and a first bit of each binary bit sequence has a binary value of "0"; and
   sending the identification code after the first bit is punctured.

26. The method of claim 25, wherein the identification code of the primary cell is selected from one of the following:

| Identification label | Identification code "medium" |
|---|---|
| a | (0)0000000 |
| b | (0)1010101 |
| c | (0)0110011 |
| d | (0)1100110 |
| e | (0)0001111 |
| f | (0)1011010 |
| g | (0)0111100 |
| h | (0)1101001 | and the binary bit in brackets is the first bit that is punctured.

27. The method of claim 25, wherein the identification code of the primary cell is selected from one of the following:

| Identification label | Identification code "long" |
|---|---|
| a | (0)0000000 |
|   | (0)0000000 |
| b | (0)0000000 |
|   | (1)1111111 |
| c | (0)1010101 |
|   | (0)1010101 |
| d | (0)1010101 |
|   | (1)0101010 |
| e | (0)0110011 |
|   | (0)0110011 |
| f | (0)0110011 |
|   | (1)1001100 |
| g | (0)1100110 |
|   | (0)1100110 |
| h | (0)1100110 |
|   | (1)0011001 | and the binary bits in brackets are the first bit that is punctured and at least one other bit that is punctured.

28. The method of claim 25, wherein the identification code of the primary cell is selected from one of the following:

| Identification label | Identification code "medium" |
|---|---|
| a | (0)000 |
|   | (0)000 |
| b | (0)000 |
|   | (1)111 |
| c | (0)101 |
|   | (0)101 |

-continued

| Identification label | Identification code "medium" |
|---|---|
| d | (0)101 |
|  | (1)010 |
| e | (0)011 |
|  | (0)011 |
| f | (0)011 |
|  | (1)100 |
| g | (0)110 |
|  | (0)110 |
| h | (0)110 |
|  | (1)001 | and the binary bits in brackets are the first bit that is punctured and at least one other bit that is punctured.

29. The method of claim 25 or 26 wherein the selected identification code bits are transmitted within a radio frame structure.

30. The method of claim 29, therein the radio frame structure comprises 15 slots, and the corresponding selected identification code bit is provided in a 1 bit feedback identifier (FBI) field of the slot.

31. The method of claim 25, 27 or 28, wherein the selected identification code bits are transmitted within a radio frame structure, which comprises 15 slots, the corresponding selected identification code bits are provided in a 2 bit feedback identifier (FBI) field of the slot.

32. The method of claim 25, wherein a user equipment (UE) periodically sends the selected identification code of the primary cell via a portion of an uplink feedback indicator (FBI) field.

33. The method of claim 25, 26, 27, or 28, wherein the each of the plurality codes comprises Hadamard code of 16 bits or 8 bits.

34. A method of sending an identification code of a primary cell by a user equipment, comprising:
  selecting the primary cell among a plurality of cells based on a measurement of common pilot signals received from the cells;
  selecting the identification code from one of Hadamard codes; and
  sending the identification code after at least one bit is punctured.

35. The method of claim 34, wherein the identification code of the primary cell is selected from one of the following:

| Identification label | Identification code "medium" |
|---|---|
| a | (0)0000000 |
| b | (0)1010101 |
| c | (0)0110011 |
| d | (0)1100110 |
| e | (0)0001111 |
| f | (0)1011010 |
| g | (0)0111100 |
| h | (0)1101001 | and the binary bit in brackets is the first bit that is punctured.

36. The method of claim 34, wherein the identification code of the primary cell is selected from one of the following:

| Identification label | Identification code "long" |
|---|---|
| A | (0)0000000 |
|  | (0)0000000 |
| B | (0)0000000 |
|  | (1)1111111 |
| C | (0)1010101 |
|  | (0)1010101 |
| D | (0)1010101 |
|  | (1)0101010 |
| E | (0)0110011 |
|  | (0)0110011 |
| f | (0)0110011 |
|  | (1)1001100 |
| g | (0)1100110 |
|  | (0)1100110 |
| h | (0)1100110 |
|  | (1)0011001 | and the binary bits in brackets are the first bit that is punctured and at least one other bit that is punctured.

37. The method of claim 34, wherein the identification code of the primary cell is selected from one of the following:

| Identification label | Identification code "medium" |
|---|---|
| a | (0)000 |
|  | (0)000 |
| b | (0)000 |
|  | (1)111 |
| c | (0)101 |
|  | (0)101 |
| d | (0)101 |
|  | (1)010 |
| e | (0)011 |
|  | (0)011 |
| f | (0)011 |
|  | (1)100 |
| g | (0)110 |
|  | (0)110 |
| h | (0)110 |
|  | (1)001 | and the binary bits in brackets are the first bit that is punctured and at least one other bit that is punctured.

38. The method of claim 34 or 35 wherein the selected identification code bits are transmitted within a radio frame structure.

39. The method of claim 38, wherein the radio frame structure comprises 15 slots, and the corresponding selected identification code bit is provided in a 1 bit feedback identifier (FBI) field of the slot.

40. The method of claim 34, 36 or 37, wherein the selected identification code bits are transmitted within a radio frame structure, which comprises 15 slots, the corresponding selected identification code bits are provided in a 2 bit feedback identifier (FBI) field of the slot.

41. The method claim 34, wherein a user equipment (UE) periodically sends the selected identification code of the primary cell via a portion of an uplink feedback indicator (FBI) field.

42. A method of sending an identification code of a primary cell by a user equipment, comprising:
  selecting the primary cell among a plurality of cells based on a measurement of common pilot signals received from the cells;

selecting the identification code of the primary cell from one of the following:

| Identification label | Identification code "long" |
|---|---|
| a | 000000000000000 |
| b | 101010101010101 |
| c | 011001100110011 |
| d | 110011001100110 |
| e | 000111100001111 |
| f | 101101001011010 |
| g | 011110000111100 |
| h | 110100101101001 | and
  sending the selected identification code.

43. A method of sending an identification code of a primary cell by a user equipment, comprising:
  selecting the primary cell among a plurality of cells based on a measurement of common pilot signals received from the cells;
  selecting the identification code of the primary cell from one of the following:

| Identification label | Identification code "medium" |
|---|---|
| A | (0)0000000 |
| B | (0)1010101 |
| C | (0)0110011 |
| d | (0)1100110 |
| e | (0)0001111 |
| f | (0)1011010 |
| g | (0)0111100 |
| h | (0)1101001 | and
  sending the selected identification code after at least one bit indicated by brackets is punctured.

44. A method of sending an identification code of a primary cell by a user equipment, comprising:
  selecting the primary cell among a plurality of cells based on a measurement of common pilot signals received from the cells;
  selecting the identification code of the primary cell from one of the following:

| Identification label | Identification code "short" |
|---|---|
| a | 00000 |
| b | 01001 |
| c | 11011 |
| d | 10010 |
| e | 00111 |
| f | 01110 |
| g | 11100 |
| h | 10101 | and
  sending the selected identification code.

45. A method of sending an identification code of a primary cell by a user equipment, comprising:
  selecting the primary cell among a plurality of cells based on a measurement of common pilot signals received from the cells;
  selecting the identification code of the primary cell from one of the following:

| Identification label | Identification code "long" |
|---|---|
| a | (0)0000000 |
|   | (0)0000000 |
| b | (0)0000000 |
|   | (1)1111111 |
| c | (0)1010101 |
|   | (0)1010101 |
| d | (0)1010101 |
|   | (1)0101010 |
| e | (0)0110011 |
|   | (0)0110011 |
| f | (0)0110011 |
|   | (1)1001100 |
| g | (0)1100110 |
|   | (0)1100110 |
| h | (0)1100110 |
|   | (1)0011001 | and
  sending the selected identification code after at least one bit indicated by brackets is punctured.

46. A method of sending an identification code of a primary cell by a user equipment, comprising:
  selecting the primary cell among a plurality of cells based on a measurement of common pilot signals received from the cells;
  selecting the identification code of the primary cell from one of the following:

| Identification label | Identification code "medium" |
|---|---|
| a | (0)000 |
|   | (0)000 |
| b | (0)000 |
|   | (1)111 |
| c | (0)101 |
|   | (0)101 |
| d | (0)101 |
|   | (1)010 |
| e | (0)011 |
|   | (0)011 |
| f | (0)011 |
|   | (1)100 |
| g | (0)110 |
|   | (0)110 |
| h | (0)110 |
|   | (1)001 | and
  sending the selected identification code after at least one bit indicated by brackets is punctured.

47. A method of sending an identification code of a primary cell by a user equipment, comprising:
  selecting the primary cell among a plurality of cells based on a measurement of common pilot signals received from the cells;
  selecting the identification code of the primary cell from one of the following:

| Identification label | Identification code "short" |
|---|---|
| a | 000 |
|   | 000 |
| b | 000 |
|   | 111 |
| c | 101 |
|   | 101 |
| d | 101 |
|   | 010 |
| e | 011 |
|   | 011 |
| f | 011 |
|   | 100 |
| g | 110 |
|   | 110 |
| h | 110 |
|   | 001 | and sending the selected identification code.

48. The method of claim 42, 43, or 44, wherein the selected identification code bits are transmitted within a radio frame structure, which comprises 15 slots, and the corresponding selected identification code bit is provided in a 1 bit feedback identifier (FBI) field of the slot.

49. The method of claim 45, 46, or 47, wherein the selected identification code bits are transmitted within a radio frame structure, which comprises 15 slots and the corresponding selected identification code bits are provided in a 2 bit feedback identifier (FBI) field of the slot.

* * * * *